(12) United States Patent
Takeuchi et al.

(10) Patent No.: US 11,531,170 B2
(45) Date of Patent: Dec. 20, 2022

(54) INTELLIGENT PATCH PANEL

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Chi Kong Paul Ng, Princeton, NJ (US); Edward M. Jack, Ashby, MA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 254 days.

(21) Appl. No.: 16/659,248

(22) Filed: Oct. 21, 2019

(65) Prior Publication Data

US 2020/0166718 A1  May 28, 2020

Related U.S. Application Data

(60) Provisional application No. 62/772,413, filed on Nov. 28, 2018.

(51) Int. Cl.
*G02B 6/36* (2006.01)
*G02B 6/38* (2006.01)
(Continued)

(52) U.S. Cl.
CPC ....... *G02B 6/3895* (2013.01); *G02B 6/02052* (2013.01); *G02B 6/3825* (2013.01); *G02B 6/3897* (2013.01); *G02B 6/4204* (2013.01)

(58) Field of Classification Search
CPC .............. G02B 6/3895; G02B 6/02052; G02B 6/3825; G02B 6/3897; G02B 6/4204; G02B 6/4286; G02B 6/4452
(Continued)

(56) References Cited

U.S. PATENT DOCUMENTS 4,805,979 A  2/1989 Bossard et al.
6,300,569 B1  10/2001 Mullen, Jr.
(Continued)

FOREIGN PATENT DOCUMENTS

WO  2018204864 A1  11/2018
WO  2020091823 A1  5/2020

OTHER PUBLICATIONS

International Search Report with Written Opinion for Application No. PCT/US2019/063749 dated Mar. 24, 2020, 17 pages.
(Continued)

*Primary Examiner* — Kaveh C Kianni
*Assistant Examiner* — Hung Q Lam
(74) *Attorney, Agent, or Firm* — Lerner, David, Littenberg, Krumholz & Mentlik, LLP

(57) ABSTRACT

An optical connection identification assembly includes first and second connectors for conveying optical signals within and away from the optical connection identification assembly, first and second optical filters configured for conveying optical signals to and from the respective first and second connectors and between each other, and first and second photodiodes. The first photodiode is configured for receiving optical signals from the first optical filter to confirm the optical connection identification assembly is receiving optical signals. The second photodiode is configured for receiving optical signals from the second optical filter to confirm the optical connection identification assembly is receiving optical signals. The first and the second connectors are on opposite sides of each of the first and the second optical filters and each of the first and the second photodiodes. Multiple optical connection identification assemblies are used in a system to prepare a connectivity map of a fiber optic system.

30 Claims, 20 Drawing Sheets

(51) Int. Cl.
*G02B 6/02* (2006.01)
*G02B 6/42* (2006.01)

(58) Field of Classification Search
USPC .................. 385/16, 48, 49, 76, 135–136
See application file for complete search history.

(56) References Cited

U.S. PATENT DOCUMENTS

| | | | |
|---|---|---|---|
| 6,424,781 | B1 | 7/2002 | Puetz et al. |
| 7,965,186 | B2 | 6/2011 | Downie et al. |
| 8,313,250 | B2 | 11/2012 | Drouard |
| 8,380,036 | B2 | 2/2013 | Smith |
| 8,550,722 | B2 | 10/2013 | Ringgenberg et al. |
| 8,556,356 | B2 | 10/2013 | Anderson et al. |
| 8,596,882 | B2 | 12/2013 | Smrha et al. |
| 9,008,484 | B2 | 4/2015 | Takeuchi et al. |
| 9,285,552 | B2 | 3/2016 | Marcouiller et al. |
| 9,323,020 | B2 | 4/2016 | Cao et al. |
| 9,525,483 | B2 | 12/2016 | Johnson, IV et al. |
| RE46,780 | E | 4/2018 | Anderson et al. |
| 10,281,670 | B2 | 5/2019 | Vaughn et al. |
| 10,656,361 | B2 | 5/2020 | Takeuchi et al. |
| 2003/0103750 | A1 | 6/2003 | Laporte et al. |
| 2004/0211774 | A1 | 10/2004 | Daoud et al. |
| 2006/0093303 | A1 | 5/2006 | Reagan et al. |
| 2007/0189692 | A1 | 8/2007 | Zimmel et al. |
| 2008/0226250 | A1 | 9/2008 | Gonzales et al. |
| 2009/0166404 | A1 | 7/2009 | German et al. |
| 2010/0038130 | A1 | 2/2010 | Zhong et al. |
| 2010/0109892 | A1 | 5/2010 | Fariello et al. |
| 2010/0183276 | A1 | 7/2010 | Smith |
| 2010/0322580 | A1 | 12/2010 | Beamon et al. |
| 2011/0217017 | A1 | 9/2011 | Drouard et al. |
| 2012/0051707 | A1 | 3/2012 | Barnes et al. |
| 2012/0224823 | A1 | 9/2012 | Cox et al. |
| 2012/0281509 | A1* | 11/2012 | Liang .................... H04Q 1/136 367/137 |
| 2013/0004136 | A1 | 1/2013 | Brower et al. |
| 2013/0064506 | A1 | 3/2013 | Eberle, Jr. et al. |
| 2013/0196538 | A1 | 8/2013 | Takeuchi et al. |
| 2014/0038462 | A1 | 2/2014 | Coffey et al. |
| 2015/0155696 | A1 | 6/2015 | Coenegracht et al. |
| 2015/0234132 | A1* | 8/2015 | Guo ..................... G02B 6/4479 29/836 |
| 2016/0178859 | A1 | 6/2016 | Thompson et al. |
| 2017/0003459 | A1 | 1/2017 | Takeuchi et al. |
| 2017/0195051 | A1 | 7/2017 | Yamamoto et al. |
| 2017/0235067 | A1 | 8/2017 | Holmberg et al. |
| 2018/0027703 | A1 | 1/2018 | Adiletta et al. |
| 2018/0136410 | A1 | 5/2018 | Takeuchi et al. |
| 2019/0260175 | A1* | 8/2019 | Peng .................... G01M 11/30 |
| 2022/0120989 | A1 | 4/2022 | Takeuchi et al. |

OTHER PUBLICATIONS

International Search Report for PCT/US18/31219 dated Aug. 1, 2018.
Excerpt of ISE Magazine, vol. 36, Issue 2 (Feb. 2018).
"YOURx-Aerial Terminal—Patch and Splice", Clearfield, Aug. 31, 2018, 4 pages.
"FieldShield YOURx-Terminal: Installation Manual", Clearfield, Jul. 2017, 33 pages.
"YOURx-Aerial Terminal: Installation Manual", Clearfield, Sep. 2018, 29 pages.
"YOURx-Terminal", Clearfield, Oct. 29, 2018, 7 pages.
"Guide to Fiber Optics & Premises Cabling", The Fiber Optic Association, Inc., http://www.thefoa.org/tech/ref/OSP/term.html, 2015, 27 pages.
International Search Report with Written Opinion for Application No. PCT/US2019/00063 dated Mar. 10, 2020, 26 pages.
Corrected International Search Report with Written Opinion for Application No. PCT/US2019/00063 dated Apr. 7, 2020, 22 pages.
Wellbrock GA, Xia TJ, Huang MF, Chen Y, Salemi M, Huang YK, Ji P, Ip E, Wang T. First field trial of sensing vehicle speed, density, and road conditions by using fiber carrying high speed data. In2019 Optical Fiber Communications Conference and Exhibition (OFC) Mar. 7, 2019 (pp. 1-3). IEEE.
Extended European Search Report issued in Appln. No. 19889245.7 dated Aug. 29, 2022 (13 pages).

\* cited by examiner

INTELLIGENT PATCH PANEL

CROSS-REFERENCE TO RELATED APPLICATION

The present application claims the benefit of the filing date of U.S. Provisional Patent Application No. 62/772,413, filed Nov. 28, 2018, the disclosure of which is hereby incorporated herein by reference.

BACKGROUND

Optical fibers are optically connected to respective opposing optical fibers to convey signals between the respective connected fibers, which may occur in the operation of data storage and transmission devices. To establish connections between respective opposing optical fibers, connectors on ends of respective opposing optical fibers are inserted into ports on opposing ends of adapters.

Connections between optical fiber connectors and the adapters are often made using a click-to-lock configuration, as in the case of optical fiber "LC connectors" and "SC connectors." This configuration prevents disconnection of connectors when they are connected to a corresponding adapter, such as by pullout, and also provides a tactile feedback to alert a user attaching connectors to a corresponding adapter that a full connection in which unintended disconnection has been prevented has been made.

Sometimes, incomplete connections are made between a connector and an adapter, which may be undetected by users, such as technicians installing or repairing optical fiber termination systems, such as patch panels and associated optical fiber cables. Additionally, fatigue or other stresses induced through use of the connectors may weaken mechanical connections between connectors or between a connector and an adapter causing connections to be broken or inadequate. Moreover, damage to the optical fibers themselves can disrupt optical signals or cause such signals to be broken. Such incomplete or broken connections or disrupted signals have caused reduced system performance or even complete system failure. Identification of broken connections or signals can be cumbersome, often requiring time-consuming inspection of multiple optical fiber cables and sometimes even inspection of multiple optical fiber termination assemblies.

Therefore, there exists a need for quickly identifying broken optical fiber connections and signals.

SUMMARY

In accordance with an aspect, an optical connection identification assembly may include first and second connectors, a first optical filter, a second optical filter, a first photodiode, and a second photodiode. The first and second connectors may be configured for conveying optical signals within and away from the optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter to confirm the optical connection identification assembly is receiving optical signals. The second photodiode may be configured for receiving an optical signal from the second optical filter to confirm the optical connection identification assembly is receiving optical signals. The first and the second connectors may be configured such that at least a portion of optical signals conveyed to or from either one of the first and the second connectors are conveyed to each of the first and the second optical filters and to each of the first and the second photodiodes.

In some arrangements, the first and the second connectors may be on opposite sides of the combination of each of the first and the second optical filters and each of the first and the second photodiodes.

In some arrangements, the optical connection identification assembly may be used for identifying the status of an optical connection at an intermediate location between two terminals configured for optical communication.

In some arrangements, the first photodiode may be adjacent to the first optical filter such that light is conveyed between the first photodiode and the first optical filter without any interference, i.e., impediment. In some arrangements, the second photodiode may be adjacent to the second optical filter such that light is conveyed between the second photodiode and the second optical filter without any interference.

In some arrangements, the first and the second optical filters and the first and the second photodiodes may define a power monitoring system.

In some arrangements, the optical connection identification assembly may further include a first connector optical fiber extending between the first connector and the first optical filter and a second connector optical fiber extending between the second connector and the second optical fiber. The first connector optical fiber may be configured for conveying optical signals between the first connector and the first optical filter. The second connector optical fiber may be configured for conveying optical signals between the second connector and the second optical filter.

In some arrangements, the optical connection identification assembly may further include third and fourth connectors, a third optical filter, a fourth optical filter, a third photodiode, and a fourth photodiode. The third and the fourth connectors may be configured for conveying optical signals within and away from the optical connection identification assembly. The third optical filter may be configured for conveying an optical signal to or from the third connector. The fourth optical filter may be configured for conveying an optical signal to or from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The first, the second, the third, and the fourth optical filters and the first, the second, the third, and the fourth photodiodes may be attached to a base. The first and the third connectors may be on a first side of the base and the second and the fourth connectors may be on a second side of the base opposite the first side.

In some arrangements, the optical connection identification assembly may further include a filter optical fiber extending between the first and the second optical filters. The filter optical fiber may be configured for conveying optical signals between the first and the second optical filters.

In some arrangements, the optical connection identification assembly may further include a signal generation unit remote from the first and the second photodiodes. Either one or both of the first photodiode and the second photodiode may convey an electrical signal that when conveyed results in the signal generation unit indicating an optical signal is conveyed from the one or both of the first photodiode and the second photodiode conveying the electrical signal.

In some arrangements, the optical connection identification assembly may further include a first filter base, a second filter base, and a power monitoring base. The first filter base may be attached to and may support the first optical filter. The second filter base may be attached to and may support the second optical filter in which the second filter base may be spaced from the first filter base. The power monitoring base may be attached to and may support the first and the second filter bases.

In some such arrangements, the first filter base may be attached to and may support the first photodiode, and the second filter base may be attached to and may support the second photodiode.

In some arrangements, the optical connection identification assembly may further include a filter base and a power monitoring base. The filter base may be attached to and may support each of the first and the second optical filters. The power monitoring base may be attached to and may support the filter base.

In some such arrangements, the filter base may be attached to and may support the first and the second photodiodes.

In some arrangements, the optical connection identification assembly may further include a first connector optical fiber and a second connector optical fiber. The first connector optical fiber may extend between the first connector and the first optical filter. The second connector optical fiber may extend between the second connector and the second optical filter. The first connector optical fiber may be configured for conveying optical signals from the first connector to the first optical filter such that portions of the optical signals conveyed from the first connector are reflected from the first optical filter and a remaining portion of the optical signals conveyed from the first connector are received by the first photodiode. The second connector optical fiber may be configured for conveying optical signals from the second connector to the second optical filter such that portions of the optical signals conveyed from the second connector are reflected from the second optical filter and remaining portions of the optical signals conveyed from the second connector are received by the second photodiode.

In some arrangements, a majority of the portions of the optical signals conveyed from the first connector may be reflected from the first optical filter. In some arrangements, a majority of the portions of the optical signals conveyed from the second connector may be reflected from the second optical filter.

In some arrangements, an end of the first connector optical fiber may include a first facet defining a plane at an angle transverse to a first longitudinal axis of the first connector optical fiber such that light conveyed form the first connector defining the optical signals conveyed from the first connector may be deflected in a direction away from the first longitudinal axis, the light conveyed from the first connector thereby intersecting the first photodiode. In some arrangements, an end of the second connector optical fiber may include a second facet defining a plane at an angle transverse to a second longitudinal axis of the second connector optical fiber such that light conveyed from the second connector defining the optical signals conveyed from the second connector may be deflected in a direction away from the second longitudinal axis, the light conveyed from the second connector thereby intersecting the second photodiode.

In some arrangements, the optical connection identification assembly may further include an optical filter module, a first connector optical fiber, and a second connector optical fiber. The first optical filter and the second optical filter may be parts of the optical filter module. The first connector optical fiber may extend between the first connector and the optical filter module. The second connector optical fiber may extend between the second connector and the optical filter module. The first and the second connection optical fibers may be configured for conveying portions of optical signals through the optical filter module and between the first connector and the second connector. The remaining portions of the optical signals conveyed from the first connection optical fiber may be received by the first photodiode or the second photodiode and the remaining portions of the optical signals conveyed from the second connection optical fiber may be received by the other of the first and the second photodiode.

In some arrangements, a majority of the portions of the optical signals conveyed from either one or both of the first and the second connectors may be passed through the optical filter module.

In some arrangements, the remaining portions of the optical signals received by the first photodiode may be conveyed from the first optical filter or the second optical filter and the remaining portions of the optical signals received by the second photodiode may be conveyed from the other of the first and the second optical filters.

In some arrangements, the optical connection identification assembly may further include a first filter optical fiber and a second filter optical fiber. The first filter optical fiber may extend between the optical filter module and the first photodiode. The second filter optical fiber may extend between the optical filter module and the second photodiode. The first and the second filter optical fibers may be configured for conveying optical signals from the optical filter module to the first and the second photodiodes, respectively.

In some arrangements, the first and the second connectors and the optical filter module may be aligned to define a linear longitudinal axis that extends through each of the first and the second connectors and the optical filter module.

In some arrangements, the optical fiber connection identification assembly may further include either one or both of (i) a first beam splitter and a third photodiode and (ii) a second beam splitter and a light source. The first beam splitter may be between the first connector and the first optical filter. The third photodiode may be attached to a signal indicator. The first beam splitter may be configured to convey optical signals conveyed from the second beam splitter and the first connector to the third photodiode. The first signal indicator may be configured for indicating the conveyance of optical signals to the first optical filter. The second beam splitter may be between the second connector and the second optical filter. The light source may be configured for emitting optical signals towards the second beam splitter in response to a known electrical signal input. The second beam splitter may be configured to convey the optical signals emitted from the light source to the second connector and to the first optical filter.

In some arrangements, the signal indicator may be a light-emitting diode (LED).

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, and a second photodiode. The first and the second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The second optical filter may convey modulated optical signals to the second connector in response to a known electrical signal input. The second optical connection identification assembly may include third and fourth connectors, a third optical filter, a fourth optical filter, a third photodiode, a fourth photodiode, and an optical signal detection circuit. The third and the fourth connectors may be configured for conveying optical signals within and away from the second optical connection identification assembly. The third optical filter may be configured for conveying an optical signal to and from the third connector. The fourth optical filter may be configured for conveying an optical signal to and from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The optical signal detection circuit may be configured for receiving the modulated optical signals from the second connector to confirm optical power is being supplied from the first optical connection identification assembly. The third and the fourth connectors may be configured such that at least a portion of optical signals conveyed to or from either one of the third and the fourth connectors are conveyed to of each of the third and the fourth optical filters and to each of the third and the fourth photodiodes. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In some arrangements, the known electrical signal input may be generated remotely. In some such arrangements, the electrical signal input may be generated by a signal generator.

In some arrangements, the optical signal conveyed from the first connector may be a test signal. In some arrangements the optical signal conveyed from the first connector may be a signal existing prior to connection of the first and the second optical connection identification assemblies.

In some arrangements, the first optical connection identification assembly may further include a heat source configured for heating the second optical filter to control the modulation of the modulated optical signals conveyed from the second connector in response to the known electrical signal input. In some such arrangements, the electrical signal input may be generated by a signal generator. In some such arrangements, the signal generator may be in communication with the heat source via a network, which may be a cloud-based network.

In some arrangements, the first optical connection identification assembly may further include a vibratory actuator. The vibratory actuator may be configured for vibrating the second optical filter to control frequency or amplitude modulation of the modulated optical signals in response to the known electrical signal input. In some such arrangements, the electrical signal input may be generated by a signal generator. In some such arrangements, the signal generator may in communication with the vibratory actuator via a network, which may be a cloud-based network.

In some arrangements, optical signals conveyed from the second optical filter may be received by the third photodiode via the second connector, the third connector, and the intermediate optical fiber.

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, a second photodiode, and a light source. The first and second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The light source may be configured for conveying optical signals through the second connector different than the optical signals conveyed from the second optical filter. The second optical connection identification assembly may include third and fourth connectors, a third optical filter, a fourth optical filter, a third photodiode, a fourth photodiode, and an optical signal detection circuit. The third and fourth connectors may be configured for conveying optical signals within and away from the second optical connection identification assembly. The third optical filter may be configured for conveying an optical signal to and from the third connector. The fourth optical filter maybe configured for conveying an optical signal to and from the fourth connector. The third and the fourth optical filters may be configured for conveying optical signals between each other. The third photodiode may be configured for receiving an optical signal from the third optical filter. The fourth photodiode may be configured for receiving an optical signal from the fourth optical filter. The optical signal detection circuit may be configured for receiving the optical signals from the light source to confirm optical connectivity between the first and the second optical connection identification assemblies. The third and the fourth connectors may be configured such that at least a portion of optical signals conveyed to or from either one of the third and the fourth connectors are conveyed to each of the third and the fourth optical filters and to each of the third and the fourth photodiodes. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In some arrangements, the differing optical signals conveyed through the second connector from the light source and from the second optical filter may be conveyed through the second connector simultaneously via wavelength-division multiplexing (WDM).

In some arrangements, optical signals conveyed from the light source may be received by the third photodiode via the second connector, the third connector, and the intermediate optical fiber.

In some arrangements, the light source may be a light-emitting diode (LED).

In accordance with another aspect, an optical fiber connection identification system may include a first optical connection identification assembly, a second optical connection identification assembly, and an intermediate optical fiber. The first optical connection identification assembly may include first and second connectors, a first optical filter, a second optical filter, a first photodiode, a second photodiode, a third photodiode, a first beam splitter, and a light source. The first and second connectors may be configured for conveying optical signals within and away from the first optical connection identification assembly. The first optical filter may be configured for conveying an optical signal to and from the first connector. The second optical filter may be configured for conveying an optical signal to and from the second connector. The first and the second optical filters may be configured for conveying optical signals between each other. The first photodiode may be configured for receiving an optical signal from the first optical filter. The second photodiode may be configured for receiving an optical signal from the second optical filter. The first and the second connectors may be configured such that at least a portion of optical signals conveyed to or from either one of the first and the second connectors are conveyed to each of the first and the second optical filters and to each of the first and the second photodiodes. The third photodiode may be configured for receiving a known electrical signal input. The first beam splitter may be between the second optical filter and the second connector. The light source may be driven, i.e., controlled, by the third photodiode and may be configured for emitting optical signals towards the first beam splitter in response to the known electrical signal input. The first beam splitter may be configured for conveying the optical signals emitted from the light source to the second connector and to the first optical filter. The second optical connection identification assembly may include third and fourth connectors, a third optical filter, a fourth optical filter, a fourth photodiode, a fifth photodiode, a sixth photodiode, a second beam splitter, and a signal indicator. The third and the fourth connectors configured for conveying optical signals within and away from the second optical connection identification assembly. The third optical filter may be configured for conveying an optical signal to and from the third connector. The fourth optical filter may be configured for conveying an optical signal to and from the fourth connector. The third and the fourth optical filters may be configured for conveying optical signals between each other. The fourth photodiode may be configured for receiving an optical signal from the third optical filter. The fifth photodiode may be configured for receiving an optical signal from the fourth optical filter. The third and the fourth connectors may be configured such that at least a portion of optical signals conveyed to or from either one of the third and the fourth connectors are conveyed to each of the third and the fourth optical filters and to each of the fourth and the fifth photodiodes. The sixth photodiode may be configured for receiving a portion of optical signals. The second beam splitter may be between the third optical filter and the third connector. The second beam splitter may be configured for conveying optical signals conveyed from the third connector to the sixth photodiode. The signal indicator may be electrically connected to the sixth photodiode and may be configured for indicating the conveyance of optical signals from the first optical connection identification assembly. The intermediate optical fiber may be connected to and may extend between the first and the second optical connection identification assemblies.

In some arrangements, the first and the second connectors may be on opposite sides of the combination of each of the first and the second optical filters and each of the first and the second photodiodes. In some arrangements, the third and the fourth connectors may be on opposite sides of the combination of each of the third and the fourth optical filters and each of the third and the fourth photodiodes.

In accordance with another aspect, an intelligent optical fiber termination system may include an enclosure, an optical termination assembly within the enclosure, a first operational sensing mechanism, a first component at least partially within the enclosure, and a central processing unit (CPU). The optical termination assembly may include (i) a first optical fiber connector, (ii) an optical fiber extending through at least a portion of the first optical fiber connector, (iii) an adapter into which the first optical fiber connector is insertable, and a sensing mechanism. The sensing mechanism may be any one or any combination of (i) first insertion sensing mechanism configured for conveying first fiber insertion status signals corresponding to a first fiber insertion status of the first optical fiber connector into the adapter, (ii) a first fiber signal conveyance sensing mechanism configured for conveying first fiber conveyance status signals corresponding to a first fiber conveyance status of input optical signals to or of output optical signals from the first optical fiber, and (iii) a first end contact sensing mechanism configured for conveying first end contact status signals corresponding to a first end contact status of an end of the first optical fiber connector with another object when the first optical fiber connector is inserted into the adapter. The first operational sensing mechanism may be configured for conveying first operational status signals different than at least one signal-type of the conveyed ones of the first fiber insertion status signals, the first fiber conveyance status signals, and the first end contact status signals and may correspond to a first operational status of the intelligent optical fiber termination system. The CPU may be configured for receiving a plurality of CPU input signals, respectively, corresponding to each of the conveyed ones of the first fiber insertion status signals, the first fiber conveyance status signals, the first end contact status signals, and the first operational status signals. The CPU may convey a first directional signal to direct a change in state of the first component based on the CPU input signals received by the CPU.

In some arrangements, the optical termination assembly may include a patch panel or a patch panel assembly.

In some arrangements, the first fiber insertion status signals, the first end contact status signals, the first operational status signals, and the CPU input signals may be electrical signals, e.g., current. In some arrangements, the first fiber conveyance status signals may be optical signals.

In some arrangements, the first fiber conveyance sensing mechanism may be an optical signal power monitoring device. In some such arrangements, the optical signal power monitoring device may be a bi-directional optical signal power monitoring device configured for providing an indication of the conveyance of the input optical signals to or of the output optical signals from the first optical fiber.

In some arrangements, the intelligent optical fiber termination system may be configured for receiving external input signals which may include external input radio signals, external input electrical signals, external input optical signals, and any combination of such signals from an external source external to the intelligent optical fiber termination system. In such arrangements, the CPU may be configured to convey the first directional signal to the first component in response to the external input signals. In some arrangements, the external input signals may be external input radio signals and the intelligent optical fiber termination system further may include a receiver or transceiver that may be configured for electrical communication with the CPU and may be further configured for receiving the external input radio signals.

In some arrangements, the intelligent optical fiber termination system may be configured for conveying system output signals which may be system output radio signals, system output electrical signals, system output optical signals, and any combination of such signals to an external source external to the intelligent optical fiber termination system. In such arrangements, the system output signals may be directed by the CPU.

In some arrangements, system output signals may be system output radio signals and the intelligent optical fiber termination system further may include a transmitter or transceiver that may be configured for electrical communication with the CPU and further configured for conveying the system output radio signals.

In some arrangements, the first operational status signals may be second fiber insertion status signals different from the first fiber insertion status signals and corresponding to a second fiber insertion status of a second optical fiber connector insertable into the adapter. In such arrangements, the intelligent optical fiber termination system may further include the second optical fiber connector insertable into the adapter.

In some arrangements, the first optical fiber connector may include a first housing and a first ferrule translatable within the first housing. In such arrangements, the first end contact sensing mechanism may convey first end contact status signals indicating contact of the end of the first optical fiber connector with another object when the first optical fiber connector is inserted into the adapter and the first ferrule of the first optical fiber connector is in contact with a second ferrule of a second optical fiber connector.

In some arrangements, each of the conveyed ones of the first fiber insertion status signals, the first fiber conveyance status signals, the first end contact status signals, and the first operational status signals may be conveyed at one or more respective predetermined time intervals.

In some arrangements, the intelligent optical fiber termination system may further include a memory storage system in communication with a microprocessor of the CPU and configured for storing any one or any combination of the first fiber insertion statuses, the first fiber conveyance statuses, the first end contact statuses, and the first operational statuses. In some such arrangements, the memory storage system may include a memory storage device in electrical communication with the microprocessor of the CPU. In some such arrangements, the memory storage system may be part of the CPU.

In some arrangements, the stored ones of the first fiber insertion statuses, the first fiber conveyance statuses, the first end contact statuses, and the first operational statuses may be stored by the memory storage system along with respective corresponding times at which or time intervals over which the plurality of the CPU input signals are received by the CPU.

In some arrangements, a first combination of at least two mechanisms of any one or any combination of the first insertion sensing mechanism, the first fiber conveyance sensing mechanism, and the first end contact sensing mechanism may be conveying the respective first fiber insertion status signals, first fiber conveyance status signals, and first end contact status signals. In such arrangements, the first operational sensing mechanism may be one of the mechanisms of the first combination.

In some arrangements, the memory storage system may store (i) a first fiber insertion reference value for use in determining the first fiber insertion status when the optical termination assembly includes the first insertion sensing mechanism, (ii) a first fiber conveyance reference value for use in determining the first fiber conveyance status when the optical termination assembly includes the first fiber conveyance sensing mechanism, (iii) a first end contact reference value for use in determining the first end contact status when the optical termination assembly includes the first end contact sensing mechanism, and (iv) a first operational reference value for use in determining the first operational status. In such arrangements, the intelligent optical fiber termination system further may include a logic controller in communication with the memory storage system. The logic controller may be part of or may be separate from but in communication with the CPU. The logic controller may be configured for determining (i) a first relative value associated with the first fiber insertion status and based on a comparison of a determined first fiber insertion status value corresponding to the first fiber insertion status signals to the first fiber insertion reference value when the memory storage device stores the first fiber insertion reference value, (ii) a second relative value associated with the first fiber conveyance status and based on a comparison of a determined first fiber conveyance status value corresponding to the first fiber conveyance status signals to the first fiber conveyance reference value when the memory storage device stores the first fiber conveyance reference value, (iii) a third relative value associated with the first end contact status and based on a comparison of a determined first end contact status value corresponding to the first end contact status signals to the first end contact reference value when the memory storage device stores the first end contact reference value, and (iv) a fourth relative value associated with the first operational status and based on a comparison of a determined first operational status value corresponding to the first operational status signals to the first operational reference value.

In some such arrangements, the logic controller may be remote from the enclosure when the logic controller is separate from the CPU.

In some arrangements, the first directional signal may be based on at least one relative value of the first, the second, the third, and the fourth relative values determined by the logic controller, and wherein the CPU is configured for conveying a second directional signal to the first component or another component different from the first component and at least partially within the enclosure based on at least one different relative value of the first, the second, the third, and the fourth relative values.

In some arrangements, a combination of the CPU, the logic controller when separated from the CPU, and the memory storage system may be configured to effect a change to at least one of the reference values of the first insertion reference value, the first fiber conveyance status value, the first end contact status value, and the first operational value.

In some arrangements, the combination of the CPU, the logic controller when separated from the CPU, and the memory storage system are configured to effect the change to the at least one of the reference values of the first insertion reference value, the first fiber conveyance status value, the first end contact status value, and the first operational value based on the external input signals received by the intelligent optical fiber termination system when such external input signals are so received. In some such arrangements, the intelligent optical fiber termination system may be configured to convey the system output signals to the external source, and wherein the external input signals are based on the system output signals to the external source. In some arrangements, the intelligent optical fiber termination system may include the external source. In such arrangements, the external source may be a central office of an internet service provider (ISP) in which the central office may manipulate the system output signals to determine the external input signals and convey the external input signals to the intelligent optical fiber termination system.

In some arrangements, the intelligent optical fiber termination system may further include a transceiver in electrical communication with the CPU. In such arrangements, the transceiver may be configured for communicating wirelessly with a cloud network and, as such, for receiving the external input signals. In such arrangements, the external source may be remote from the enclosure and may be within the cloud network.

In some such arrangements, the transceiver may be further configured for conveying the system output signals to the external source.

In some arrangements, the memory storage system may store a plurality of (i) the determined first fiber insertion status values when the memory storage device stores the first fiber insertion reference value, (ii) the determined first fiber conveyance status values when the memory storage device stores the first fiber conveyance reference value, (iii) the determined first end contact status values when the memory storage device stores the first end contact reference value, and (iv) the determined first operational status values. In such arrangements, the combination of the CPU, the logic controller when separated from the CPU, and the memory storage system may be configured to effect the change to (i) the first fiber insertion reference value when the optical termination assembly includes the first insertion sensing mechanism based on an accumulated set or the entirety of the plurality of the first fiber insertion status values, (ii) the first fiber conveyance reference value when the optical termination assembly includes the first fiber conveyance sensing mechanism based on an accumulated set or the entirety of the plurality of the first fiber conveyance status values, (iii) the first end contact reference value when the optical termination assembly includes the first end contact sensing mechanism based on an accumulated set or the entirety of the plurality of the first end contact status values, and (iv) the first operational reference value based on an accumulated set or the entirety of the plurality of the first operational status values.

In some arrangements, the change effected to (i) the first fiber insertion reference value is to ignore the first fiber insertion reference value and set the first insertion sensing mechanism to a default setting, (ii) the first fiber conveyance reference value is to ignore the first fiber conveyance reference value and set the first fiber conveyance sensing mechanism to a default setting, (iii) the first end contact reference value is to ignore the first end contact reference value and set the first end contact sensing mechanism to a default setting, and (iv) the first operational reference value is to ignore the first operational reference value and set the first operational sensing mechanism to a default setting.

In some arrangements, the intelligent optical fiber termination system may further include a transceiver in electrical communication with the CPU and configured for communicating wirelessly with a cloud network. In such arrangements, the first directional signal may be provided by the CPU to the first component based on a first transceiver signal from the transceiver and a second directional signal may be provided to the first component or another component different from the first component and at least partially within the enclosure based on a second transceiver signal from the transceiver.

In some arrangements, the operational sensing mechanism may include any one or any combination of an environmental sensor, a position sensor, an orientation sensor, a door closure sensor, a microphone, an accelerometer, a water presence sensor, and an enclosure presence sensor.

In some arrangements, the operational sensing mechanism may be an environmental sensor. Such environmental sensor may be a temperature sensor or a humidity sensor. In some arrangements in which the operational sensing mechanism is an environmental sensor, the first component may include a heating device that may be activated to heat at least a portion of an interior of the enclosure when the environmental sensor detects a temperature below a predetermined threshold. In some arrangements in which the operational sensing mechanism is an environmental sensor, the first component may include a cooling device that may be activated to cool at least a portion of an interior of the enclosure when the environmental sensor detects either one or both of a temperature above a predetermined threshold and a humidity level above a predetermined threshold. In some such arrangements, the cooling device may include a fan.

In some arrangements, the first component or another component separate from the first component may be a sensory indication unit configured to indicate a change in any one or any combination of (i) the first fiber insertion status when the optical termination assembly includes the first insertion sensing mechanism, (ii) the first fiber conveyance status when the optical termination assembly includes the first fiber conveyance sensing mechanism, (iii) the first end contact status when the optical termination assembly includes the first end contact sensing mechanism, and (iv)

the first operational status. In such arrangements, the sensory indication unit may provide any one or any combination of a visual signal, an auditory signal, or a tactile signal.

In some arrangements, the sensory indication unit may include any one or any combination of a light emitting diode (LED), an audio speaker, and a piston-driven actuator assembly.

In some arrangements, the optical termination assembly may include the optical fiber connection identification assembly as described with respect to certain aspects and arrangements discussed above.

In accordance with another aspect, an intelligent optical fiber termination network may include the intelligent optical fiber termination system of aspects and arrangements above that include the CPU. The optical fiber termination network may further include a transceiver and a cloud network. The transceiver may be in electrical communication with the CPU. The cloud network may include the memory storage system and may be configured for communicating wirelessly with the transceiver of the intelligent optical fiber termination system.

In some arrangements, the intelligent optical fiber termination network may be a wide area network (WAN) comprising a remote site remote from the intelligent optical fiber termination system.

In accordance with another aspect, an intelligent optical fiber termination network may include the intelligent optical fiber termination system of aspects and arrangements above that include the CPU and are configured for receiving the external input signals. The intelligent optical fiber termination system may further include a transceiver and a cloud network. The transceiver may be in electrical communication with the CPU. The cloud network may include the logic controller when the logic controller is separated from the CPU in which the logic controller may be located at a remote site remote from the intelligent optical fiber termination system. In such arrangements, the cloud network may be configured for communicating wirelessly with the transceiver of the intelligent optical fiber termination system such that the transceiver receives the external input signals conveyed from the logic controller.

In accordance with another aspect, an optical fiber termination system may be controlled by a process. In this process, a first electrical input signal corresponding to any one or any combination of (i) first fiber insertion status signals corresponding to a first fiber insertion status of a first optical fiber connector into an adapter of an optical termination assembly at least partially within an enclosure of the optical fiber termination system, (ii) first fiber conveyance status signals corresponding to a first fiber conveyance status of input optical signals to or of output optical signals from the first optical fiber, (iii) first end contact status signals corresponding to a first end contact status of an end of the first optical fiber connector with another object when the first optical fiber connector is inserted into the adapter may be received by a central processing unit (CPU). A second electrical input signal corresponding to first operational status signals different than the first fiber insertion status signals, the first fiber conveyance status signals, and the first end contact status signals and corresponding to a first operational status of the optical fiber termination system may be received by the CPU. In such arrangements, a first directional signal may be conveyed by the CPU to direct a change in state of a first component at least partially within the enclosure of the optical fiber termination system based on either one or both of the first and the second electrical input signals received by the central processing unit. In such arrangements, a physical state of the first component may be changed in response to the first directional signal.

In accordance with another aspect, a connectivity map of a fiber optic system may be prepared by a process. In this process, opposing ends of a first fiber optic cable may be connected to an existing fiber optic network and to a first port of a first optical connection identification assembly, respectively, to register the first optical connection identification assembly to the fiber optic network. In this process, an end of a second fiber optic cable may be connected to a second port of the first optical connection identification assembly opposite the first port. In this process, information relating to the second fiber optic cable may be associated with information relating to the second port of the first optical connection identification assembly. In this process, information relating to a plurality of optical identification assemblies including the first optical connection identification assembly may be analyzed to determine cable connectivity between ports of the plurality of optical identification assemblies. In this process, a cable connectivity map may be created or updated, as the case may be, based on the determined cable connectivity between the ports of the plurality of optical identification assemblies.

BRIEF DESCRIPTION OF THE DRAWINGS

By way of description only, embodiments of the present disclosure are described herein with reference to the accompanying figures, in which.

DETAILED DESCRIPTION

As used herein, "optical signals" are ones that are created by the transmission of light beams. Such signals may be formed by modulating the intensity of light beams from a light source or by modulating the frequency of the transmission of light beams from a light source.

Figure 1A:
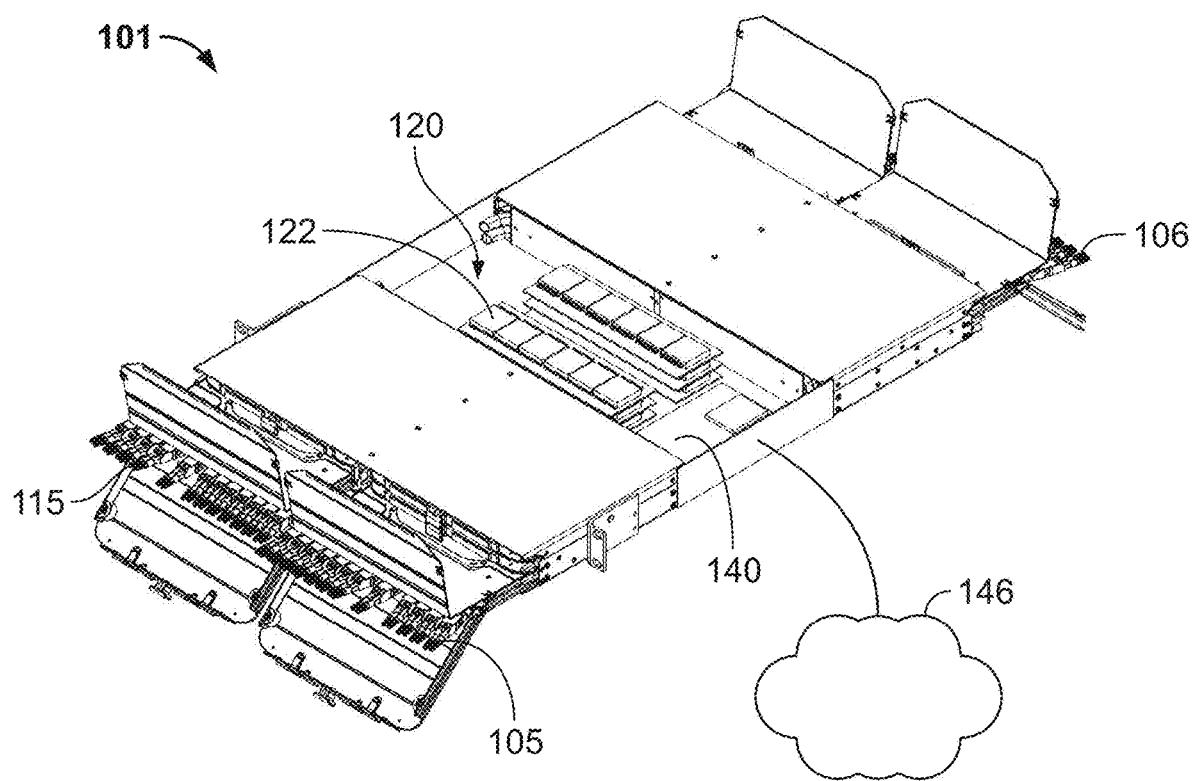
FIG. 1A is a perspective view of an optical connection identification assembly in accordance with an embodiment.
Figure 1B:
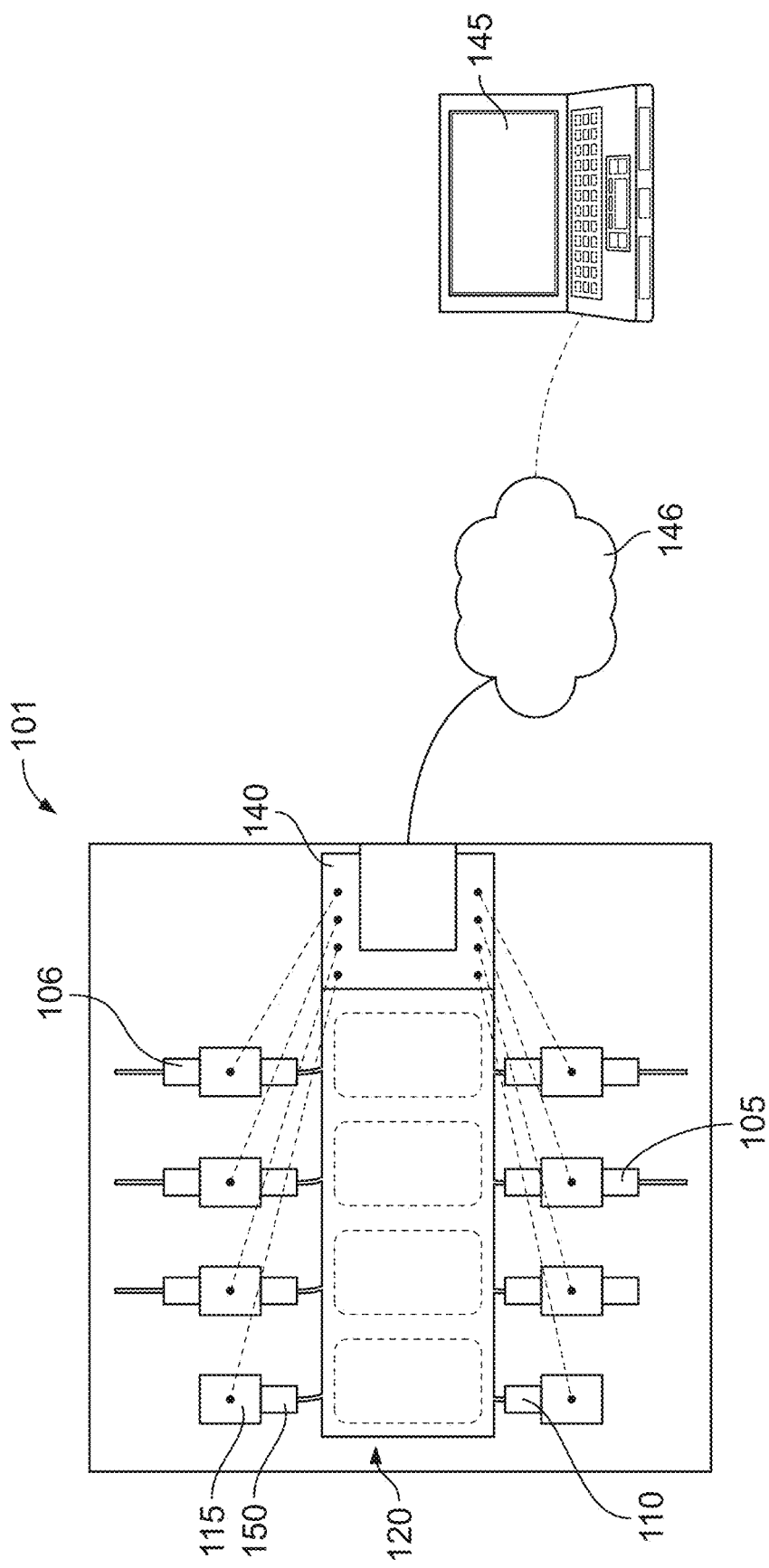
FIG. 1B is a schematic of a portion of the optical connection identification assembly of FIG. 1A within an optical connection identification system in accordance with another embodiment.

Referring now to FIGS. 1A and 1B, optical connection identification system 100, which in the example shown is in the form of a patch panel, provides for optical connections and for signals that such connections have been made. As shown, system 100 generally includes a plurality of first connectors 110 defining ends of fiber optic cables, power monitoring subassembly 120, and a plurality of second connectors 150 opposite respective ones of the plurality of first connectors 110 and also defining ends of fiber optic cables. Each of the plurality of first connectors 110 and second connectors 150 may be inserted into adapters 115 or may be integral with the adapters such that the connectors are inseparable from the adapters. As shown, opposing connectors 105 may be inserted into adapters 115 opposite respective first connectors 110 and, likewise, opposing connectors 106 may be inserted into adapters 115 opposite respective second connectors 150 such that the opposing connectors and the respective first and second connectors may be in optical communication with each other via power monitoring subassembly 120. In some arrangements, a connector engagement sensing mechanism, such as those shown and described in U.S. Patent Application Publication Nos. 2017/0003459 A1 and 2018/0136410 A1, which are hereby incorporated by reference herein, may be attached to or otherwise used in conjunction with first connectors 110, second connectors 150, opposing connectors 105, 106, and adapters 115.

As shown in FIG. 1B, power monitoring subassembly 120 generally includes a plurality of power monitoring sections 122 and microcontroller 140. Microcontroller 140 is electrically connected to first and second connectors 110, 150 or adapters 115 such that the microcontroller may monitor whether connector engagement sensors associated with any one of the first connectors, the second connectors, and the adapters are powered or unpowered for use in determining whether optical fiber connections have been made at the adapters of optical connection identification system 100. As shown, microcontroller 140 may be in communication with remote computer terminal 145 via network 146, such as but not limited to a cloud network. Each power monitoring section 122 in conjunction with a set of opposing first and second connectors 110, 150 may define a separate channel. As in the example shown, power monitoring sections 122 may provide optical signal tapping detection, which, as in the examples described herein, may be signal direction sensitive.

Figure 2:
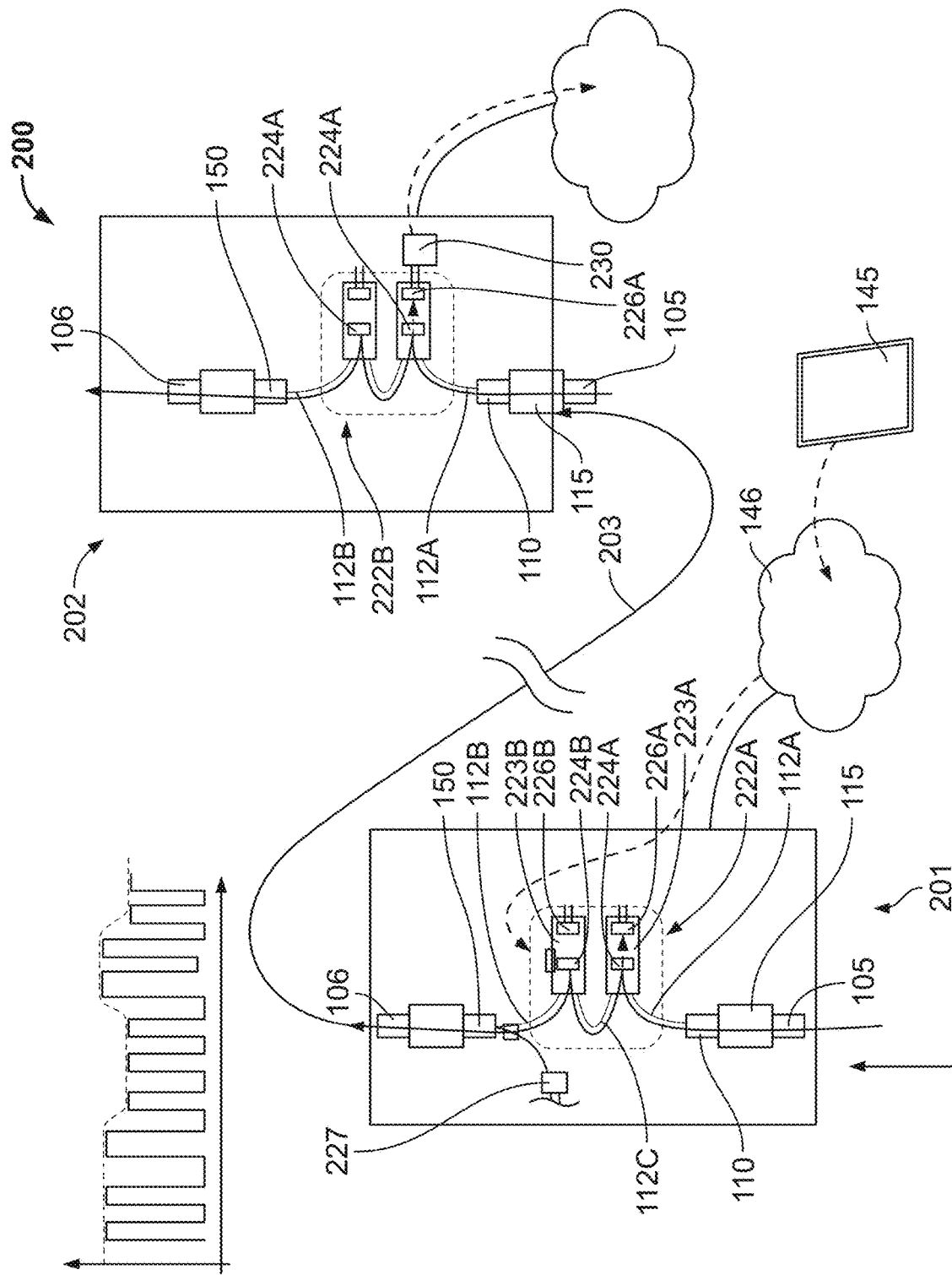
FIG. 2 is a schematic of an optical connection identification system in accordance with another embodiment.

Referring now to FIG. 2, optical connection identification system 200 includes first optical connection identification assembly 201 and second optical connection identification assembly 202, which may be substantially in the form of and function in substantially the same manner as optical connection identification system 100, optically connected by intermediate optical fiber 203. In this example, optical signals may be conveyed from the first optical connection identification assembly 201 to the second optical connection identification assembly 202 along the intermediate optical fiber 203, and vice versa, may be conveyed from the second optical connection assembly 202 to the first optical connection identification assembly 201 along the intermediate optical fiber 203. As shown, first optical connection identification assembly 201 includes a single power monitoring section 222A optically connected to a set of first and second connectors 110, 150, adapters 115, and opposing connectors 105, 106 and, likewise, second optical connection identification assembly 202 includes a single power monitoring system 222B optically connected to a set of first and second connectors 110, 150, adapters 115, and opposing connectors 105, 106. As shown, intermediate optical fiber 203 is attached on its ends to opposing connector 106 of first optical identification assembly 201 and opposing connector 105 of second optical identification assembly 202.

As shown in FIG. 2, power monitoring section 222A of optical connection identification assembly 201 includes first base 223A, first optical filter 224A attached to the first base, and first photodiode 226A attached to the first base in the form of a first module as well as second base 223B, second optical filter assembly 224B attached to the second base, and second photodiode 226B attached to the second base in the form of a second module. As used herein, the term "base" refers to a card or board, a cured bonding element for attaching optical or optoelectronic components together, or another discrete packaging element for attaching optical or optoelectronic components together. First optical fiber 112A extends between first connector 110 and first optical filter 224A such that optical signals may be conveyed along the fiber between the first connector and the first optical filter. Second optical fiber 112B extends between second connector 150 and second optical filter assembly 224B such that optical signals may be conveyed along the fiber between the second connector and the second optical filter assembly. In some arrangements, ends of each of first and second optical fiber 112A, 112B may include respective facets defining respective planes at angles transverse to longitudinal axes of the optical fibers, which may be but are not limited to being angles of approximately 8 degrees, such that light conveyed from the optical fibers is deflected at a slight angle to the ends of the respective optical fibers. Third optical fiber 112C extends between first optical filter 224A and second optical filter assembly 224B such that optical signals may be conveyed along the fiber between the first optical filter and the second optical filter assembly. Electrical leads extending from first and second photodiodes 226A, 226B may be in electrical communication with a central processing unit (CPU), such as but not limited to microcontroller 140.

In the example shown, first optical filter 224A is configured such that portions of optical signals from first optical fiber 112A pass through the first optical filter to first photodiode 226A and remaining portions of such optical signals are reflected to second optical filter assembly 224B. Second optical filter assembly 224B is configured such that portions of optical signals from second optical fiber 112B pass through the filter, which may be but is not limited to being a tap filter, of second optical filter assembly to second photodiode 226B and remaining portions of such optical signals are reflected to second connector 150 from which such signals are conveyed along intermediate optical fiber 203 to second optical identification assembly 202.

In one example as shown in FIG. 2, second optical filter assembly 224B may be manipulated, such as by but not limited to being by altering properties or changing the position, e.g., angle, of a filter of the second optical filter assembly, to convey modulated optical signals to second connector 150 in response to an electrical signal input, which may be preset or controlled remotely, for example via a combination of network 146 and computer terminal 145. In one example, second optical filter assembly 224B may include a heat source in which heat is transferred from the heat source to a filter, or other appropriate component of the second optical filter assembly, of the second optical filter assembly via modulation in response to the electrical signal input to the second optical filter assembly in order to alter the state of the filter. In this manner, second optical filter assembly 224B may convey optical signals at either one or both of a different frequency and a different intensity than when the heat is not applied or is applied at a different rate or quantity. In another example, second optical filter assembly 224B may include an electromechanical vibratory actuator attached to a filter of the second optical filter such that the actuator vibrates the filter, or other appropriate component of the second optical filter assembly, via modulation in response to the electrical signal input to the second optical filter in order to alter the state of the filter. In this manner, second optical filter assembly 224B may convey optical signals at either one or both of a different frequency and a different intensity than when the vibration is not applied to the second optical filter assembly or is applied at a different frequency or different amplitude.

In the example of FIG. 2, second optical connection identification assembly 202 is the same as first optical connection identification assembly 201 with the exception that assembly 202 includes first optical filter 224A in place of second optical filter assembly 224B and further includes optical signal detection circuit 230. Optical signals conveyed from first connector 110 of second optical connection identification assembly 202 as well as optical signals conveyed from second optical filter assembly 224B of first optical connection identification assembly 201 via second connector 150 of the first optical connection identification assembly may be received simultaneously or separately by first photodiode 226A of the second optical connection identification assembly. Detection circuit 230 is electrically connected, such as by electrical wire or other electrical connections known to those skilled in the art, to first photodiode 226A of second optical connection identification assembly 202. In some arrangements, detection circuit 230 may be configured to interpret the different one or both of the frequencies and amplitudes of optical signals conveyed from first connector 110 of second optical connection identification assembly 202 and optical signals conveyed from second optical filter assembly 224B of first optical connection identification assembly 201. Detection circuit 230 may then communicate with network 146 or another network to alert a remote terminal that optical connection identification assemblies 201, 202 are optically connected as well as simultaneously or separately alert the remote terminal that optical signals are being received, and thus power is being received, within the second optical connection assembly 202 from optical fibers 112A, 112B connected to one of connectors 110, 150 of second optical connection assembly 202 which is separate from optical signals conveyed along intermediate optical fiber 203 that are also received by the second optical connection assembly. In some arrangements, detection circuit 230 may form part or all of a microcontroller, such as microcontroller 140, while in some other arrangements, detection circuit 230 may be electrically connected to a separate microcontroller that communicates with network 146 or another network to provide information on the cable and assembly connectivity of optical connection identification system 200.

In another example as further shown in FIG. 2, first optical connection identification assembly 201 may further include light source 227 which may be used in conjunction with second optical filter assembly 224B or in conjunction with a further first optical filter 224A, without filter altering modulation capability, that may be used in place of the second optical filter assembly. Light source 227 may be located within or adjacent to power monitoring section 222A such that the light source conveys optical signals to first optical fiber 112A which are then conveyed to second optical connection identification assembly 202 via intermediate optical fiber 203 along with the optical signals separately conveyed from the optical filter, whether second optical filter assembly 224B or the further first optical filter 224A, that conveys optical signals to second connector 150 of first optical connection identification assembly 201. The optical signals conveyed from light source 227 may have a different wavelength than the optical signals conveyed from the optical filter that conveys optical signals to second connector 150. In this manner, optical signals conveyed from light source 227 may be conveyed along with other optical signals conveyed along intermediate optical fiber 203 as described previously herein via wavelength-division multiplexing (WDM). In this example, a microcontroller, such as microcontroller 140 may manage input signals that control the optical signals emitted from light source 227.

Figure 3:
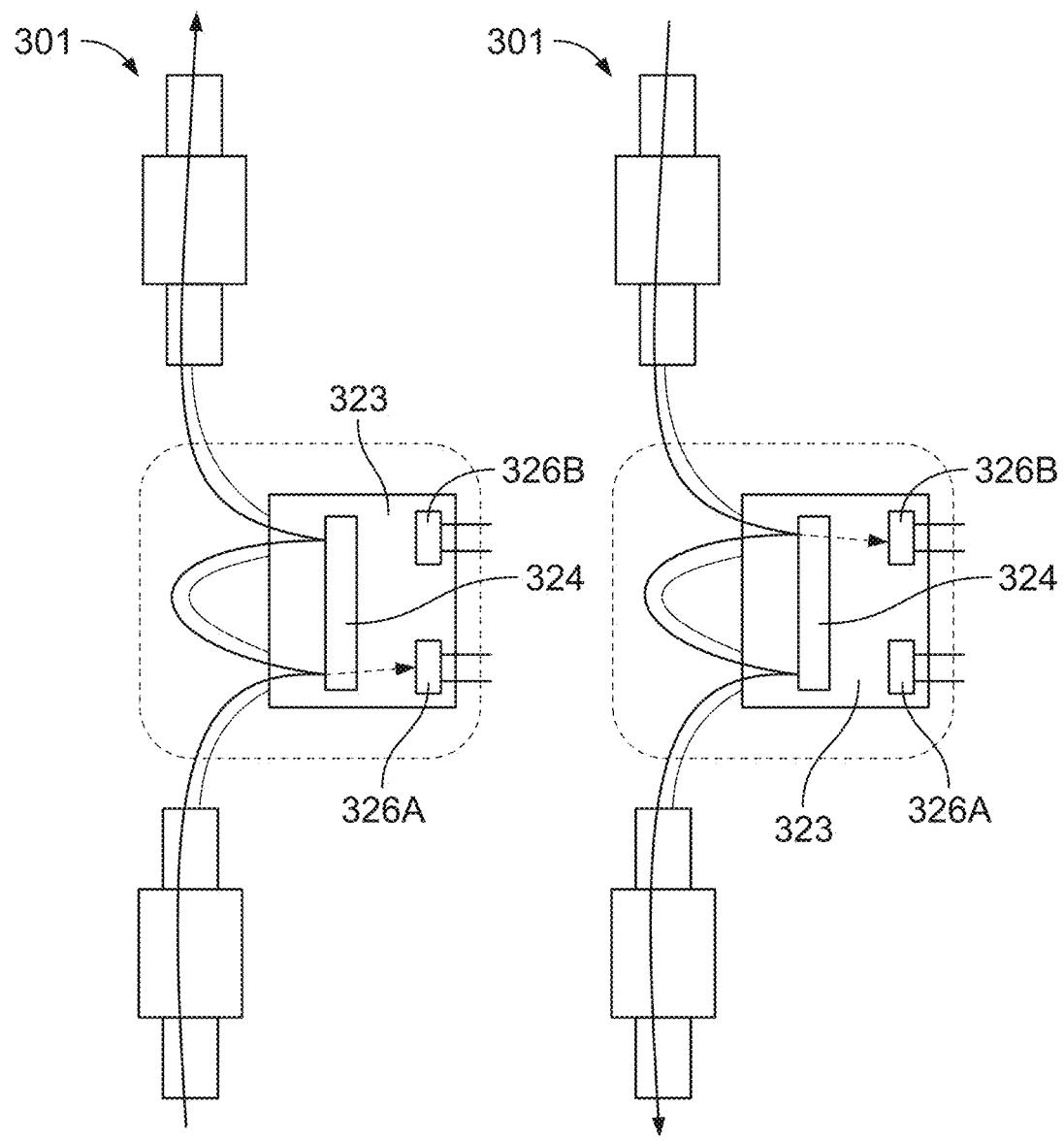
FIGS. 3-5 are schematics of optical connection identification assemblies in accordance with various embodiments.

Referring now to FIG. 3, optical connection identification assembly 301 is the same or substantially the same as second optical connection identification assembly 202 with the exception that optical connection identification assembly 301 includes a single module in place of the first and second modules of optical connection identification assembly 202. As such, optical connection identification assembly 301 includes first base 323, in place of first and second bases 223A, 223B, first optical filter assembly 324 attached to the first base in place of the plurality of optical filters 224A, and first and second photodiodes 326A, 326B attached to the first base in place of first and second photodiodes 226A, 226B. First optical filter assembly 324 may be configured such that optical signals may be conveyed from the first optical filter assembly to both first and second photodiodes 326A, 326B, such as by deflecting a light beam at different angles or paths. In this manner, optical connection identification assembly 301 functions in the same manner as second optical connection identification assembly 202. Like second optical connection identification assembly 202, in some arrangements, photodiodes 326A, 326B of optical connection identification assembly 301 may be electrically connected to a detection circuit, for example detection circuit 230, and in some arrangements, may be connected to another optical connection identification assembly. In some arrangements, lenses of long optical filters like first optical filter assembly 324 may be modulated like second optical filter assembly 224B of first optical connection identification assembly 201.

Figure 4:
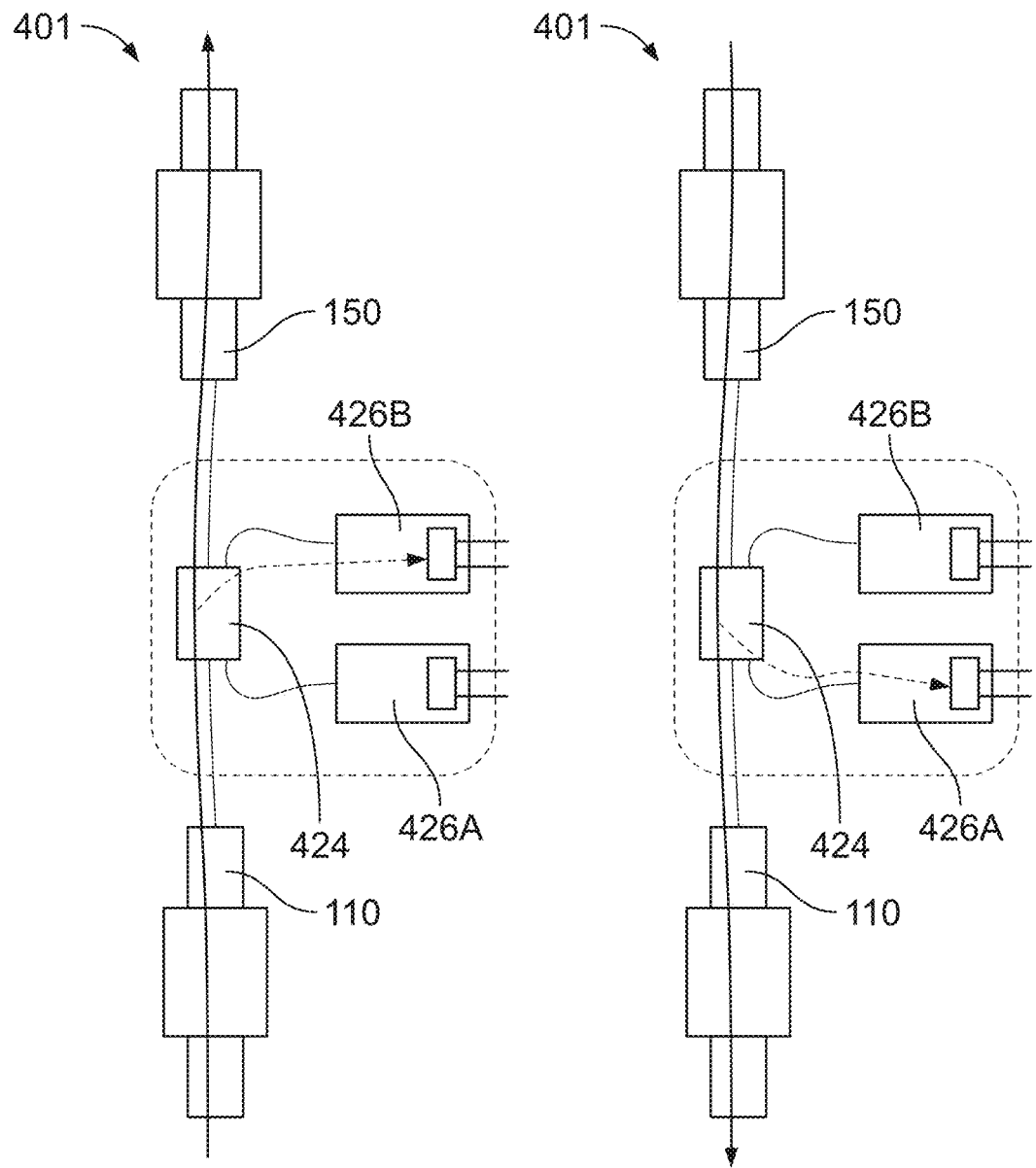

As shown in FIG. 4, optical connection identification assembly 401 is the same or substantially the same as second optical connection identification assembly 202 with the notable exceptions that first and second modules of optical connection identification assembly 401 exclude optical filters and include optical filter module 424 in place of the plurality of optical filters 224A. Optical filter module 424 is aligned with first and second connectors 110, 150 such that the optical filter module allows portions of optical signals to pass through the module and between the first and the second connectors. In some arrangements, module 424 further includes a pair of beam splitters (see FIGS. 8A-8C) such that remaining portions of optical signals received in the module from first connector 110 are reflected to second photodiode 426B of optical connection identification assembly 401 and remaining portions of optical signals received in the module from second connector 150 are reflected to first photodiode 426A of the optical connection identification assembly. In some other arrangements, module 424 may be a fused fiber module in which small portions of the optical signals conveyed from connector 110, 150 may be directed along optical fibers through module 424 such that the signals conveyed from connector 110 are directed to second photodiode 426B and the signals conveyed from connector 150 are directed to first photodiode 426A. In this manner, reflection of light to the photodiode to which the light is not directed may be substantially avoided.

Figure 5:
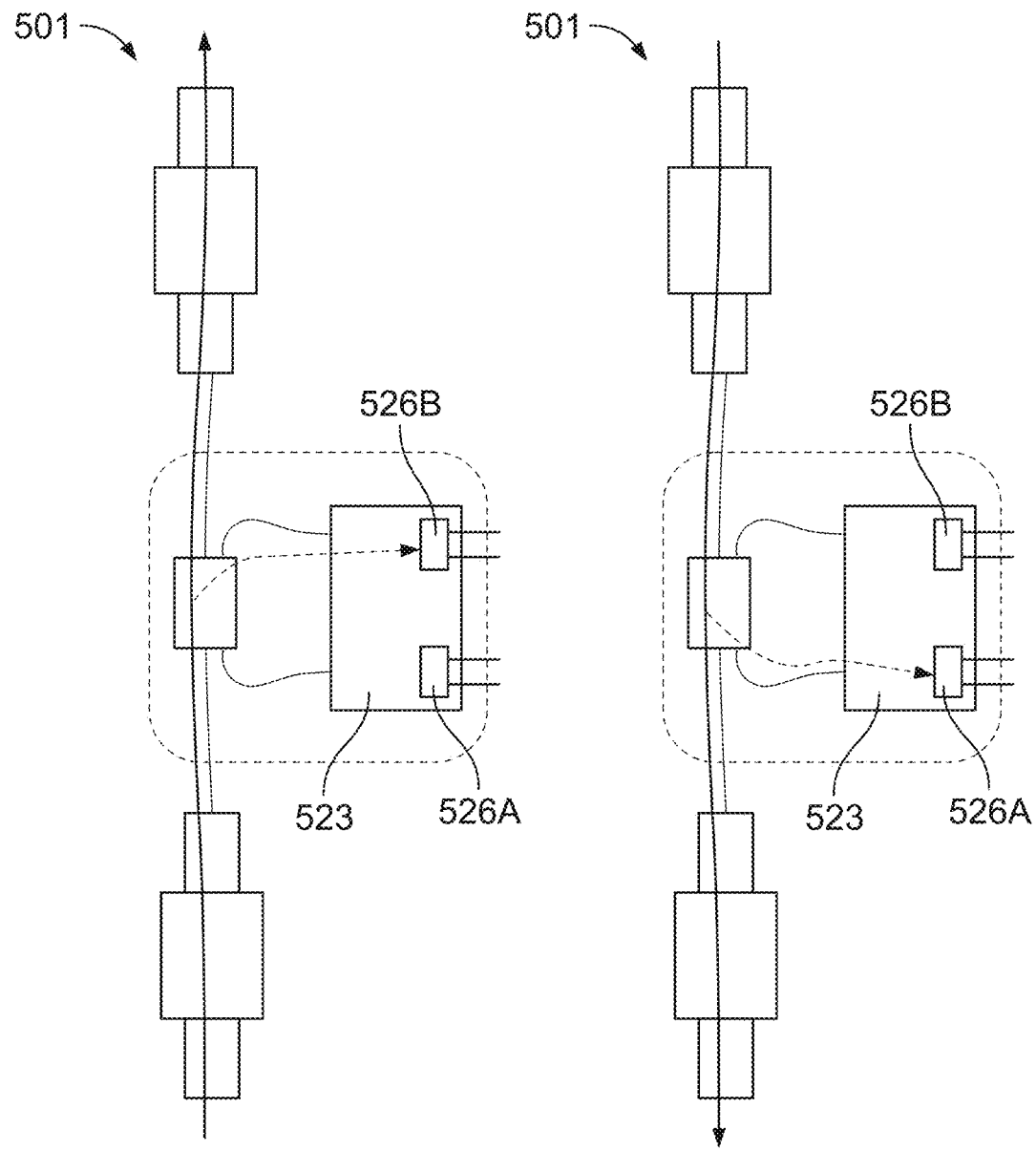

As shown in FIG. 5, optical connection identification assembly 501 is the same or substantially the same as optical connection identification assembly 401 with the exception that first photodiode 426A and second photodiode 426B of optical connection identification assembly 401 are mounted onto separate bases whereas photodiodes 526A, 526B of optical connection identification assembly 501, which are the same or substantially the same as photodiodes 426A, 426B, are mounted on the same base 523.

Figure 6A:
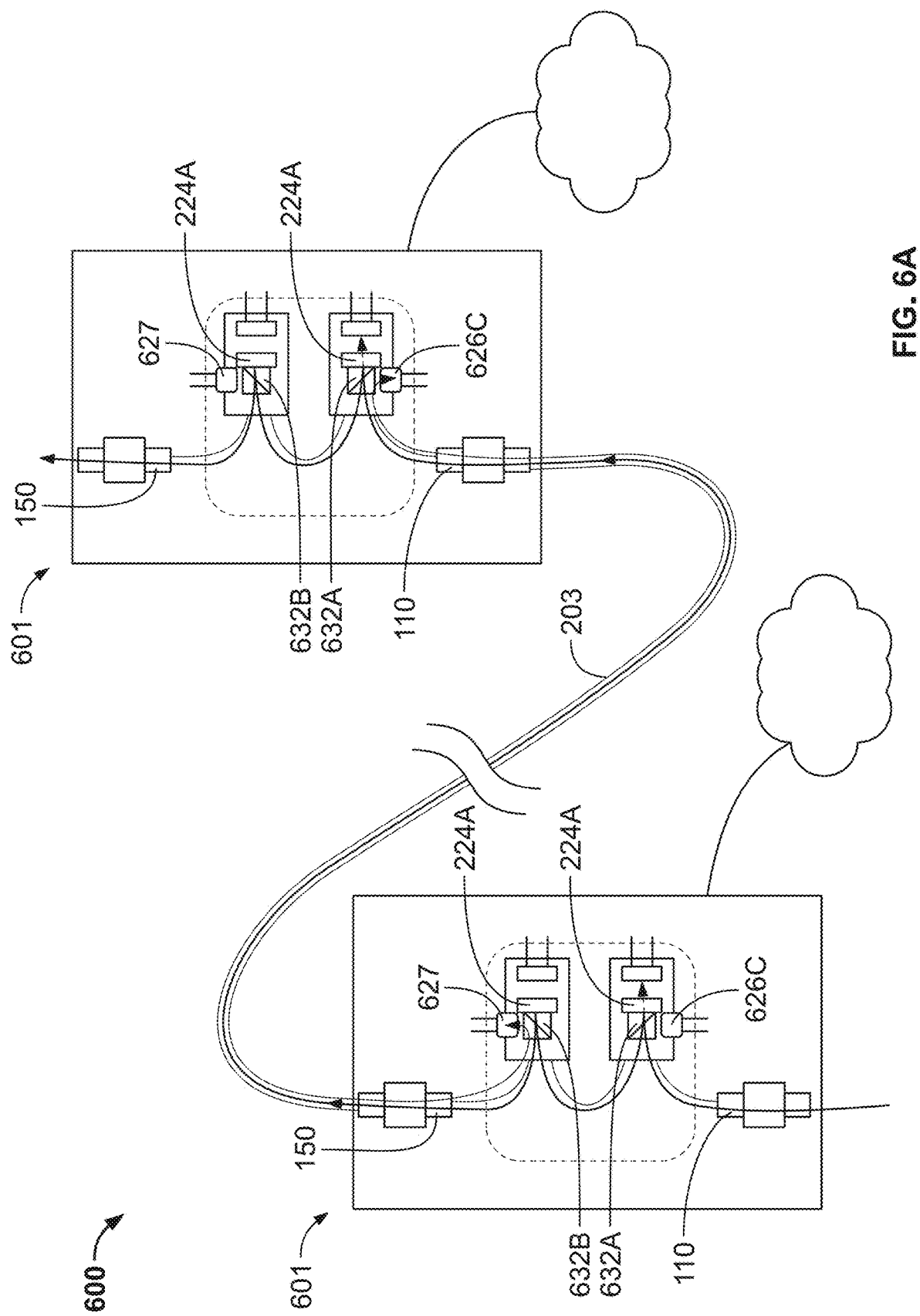
FIG. 6A is a schematic of an optical connection identification system in accordance with an embodiment.
Figure 6B:
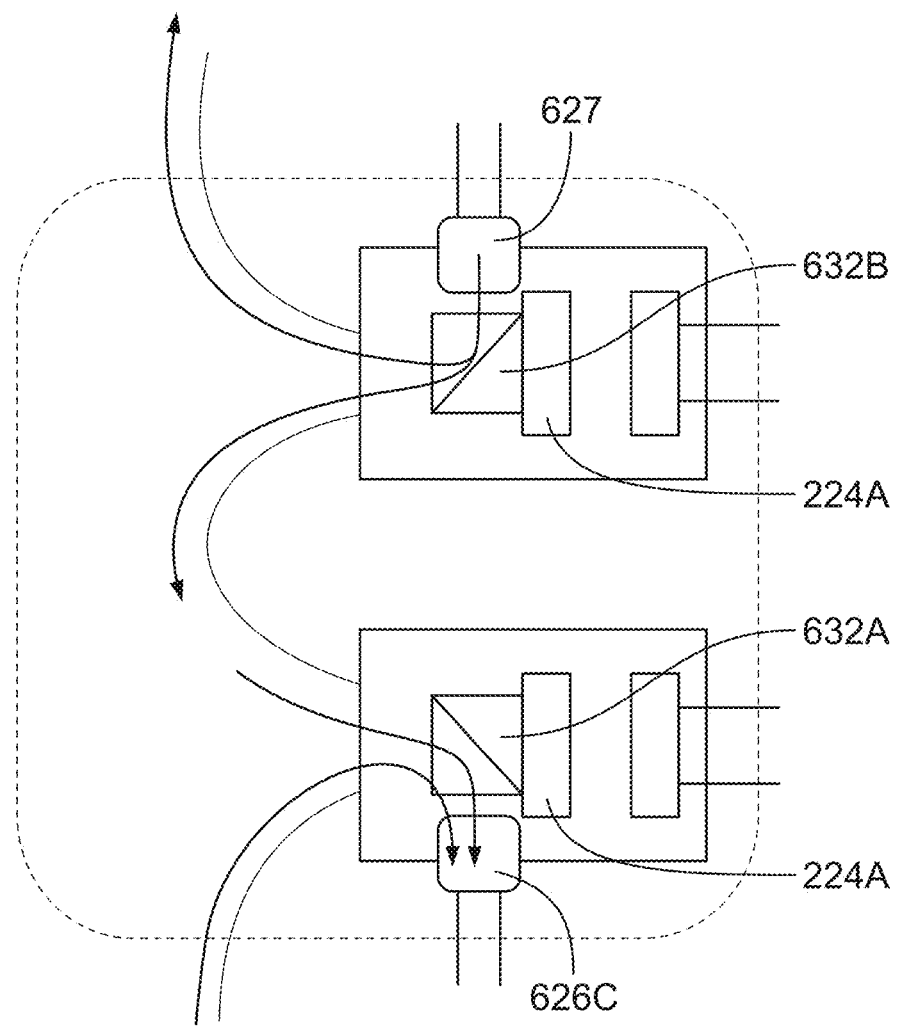
FIG. 6B is a schematic of a power monitoring section of the optical connection identification system of FIG. 6A.

Referring now to FIGS. 6A and 6B, optical connection identification system 600 includes a plurality, in the example shown a pair, of optical connection identification assemblies 601 optically connected by intermediate optical fiber 203. The optical connection identification assemblies 601 are the same as or substantially the same as second optical connection identification assembly 202 of optical connection identification system 200 with the notable exceptions that the first modules of each of assemblies 601 further include beam splitter 632A between first connector 110 and optical filter 224A of the first module and third photodiode 626C adjacent to beam splitter 632A and the second modules of each of assemblies 601 further include beam splitter 632B between second connector 150 and optical filter 224A of the second module and light source 627, which may be an LED controlled remotely such as through a network, adjacent to beam splitter 632B. In this manner, optical signals conveyed from light source 627 may be split by beam splitter 632B such that portions of the optical signals conveyed from the light source are conveyed from beam splitter 632B to third photodiode 626C via beam splitter 632A of the same optical connection identification assembly and other portions of the optical signals conveyed from the light source are conveyed from beam splitter 632B to third photodiode 626C of another optical connection identification assembly via second connector 150. As such, third photodiode 626C of each optical connection identification assembly 601 may receive optical signals from light source 627 of its own optical connection identification assembly as well as optical signals from light source 627 of a directly adjacent optical connection identification assembly. Upon receipt of such signals, third photodiode 626C may transmit an electrical signal to indicate that the adjacent optical connection identification assemblies 601 are in optical communication. As with other arrangements described previously herein, first and second photodiodes 626A, 626B may receive portions of optical signals from first and second connectors 110, 150, respectively, which the photodiodes may convert to electrical signals to provide a power monitoring system.

Figure 6C:
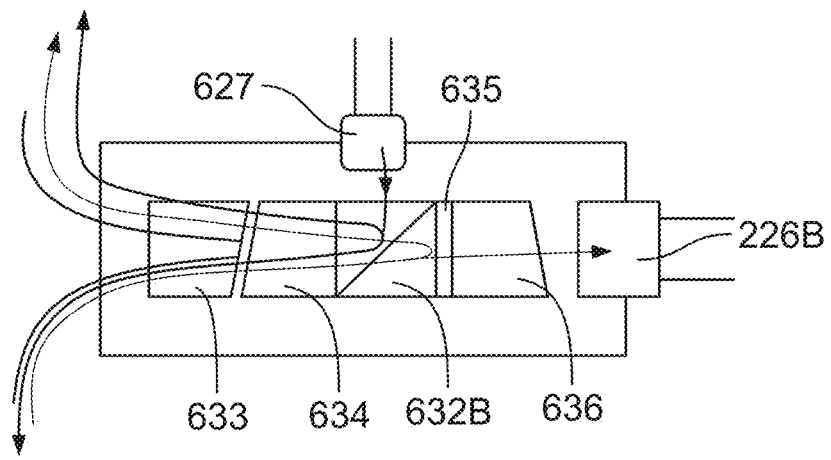
FIGS. 6C and 6D are schematics of modules of the power monitoring section of FIG. 6B.
Figure 6D:
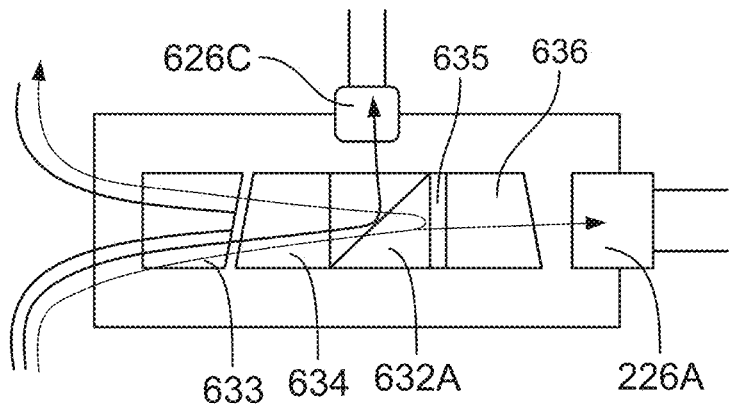

As shown in FIGS. 6C and 6D, the combinations of optical filter 224A and each of beam splitters 632A, 632B may each include fiber support 633, collimation lens 634 directly adjacent to the fiber support, beam splitter 632A, 632B directly adjacent to the collimation lens, tap filter 635 directly adjacent to the beam splitter, and focusing lens 636 directly adjacent to the tap filter. In some arrangements, tap filter 635 may allow 0.5 to 10% of light received by the tap filter to pass through the tap filter to focusing lens 636 and then to respective first and second photodiodes 226A, 226B.

Figure 7:
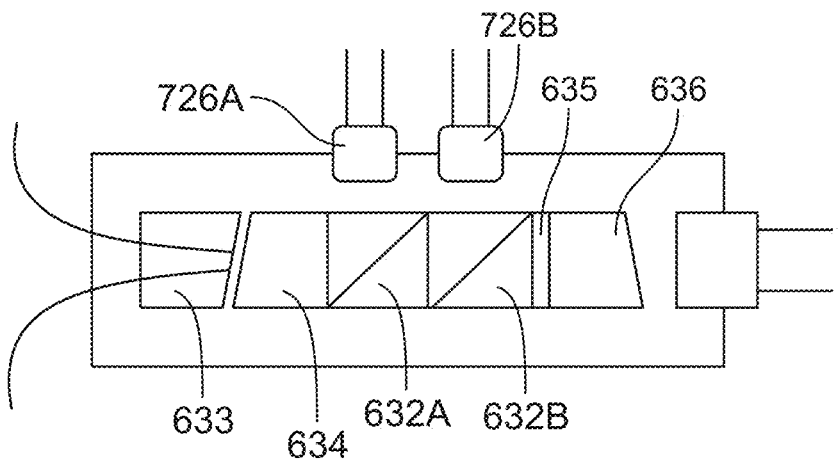
FIG. 7 is a schematic of a module for a power monitoring section in accordance with another embodiment.

In an alternative arrangement to one or both of optical connection identification assemblies 601, as shown in FIG. 7, the first and second modules of assembly 601 may be replaced with a single integrated module that includes fiber support 633, collimation lens 634 directly adjacent to the fiber support, first beam splitter 632A directly adjacent to the collimation lens, second beam splitter 632B directly adjacent to beam splitter 632A, tap filter 635 directly adjacent to beam splitter 632B, and focusing lens 636 directly adjacent to the tap filter. In this arrangement, first photodiode 726A is directly adjacent to beam splitter 632A and second photodiode 726B is directly adjacent to beam splitter 632B and to first photodiode 726A.

Figure 8A:
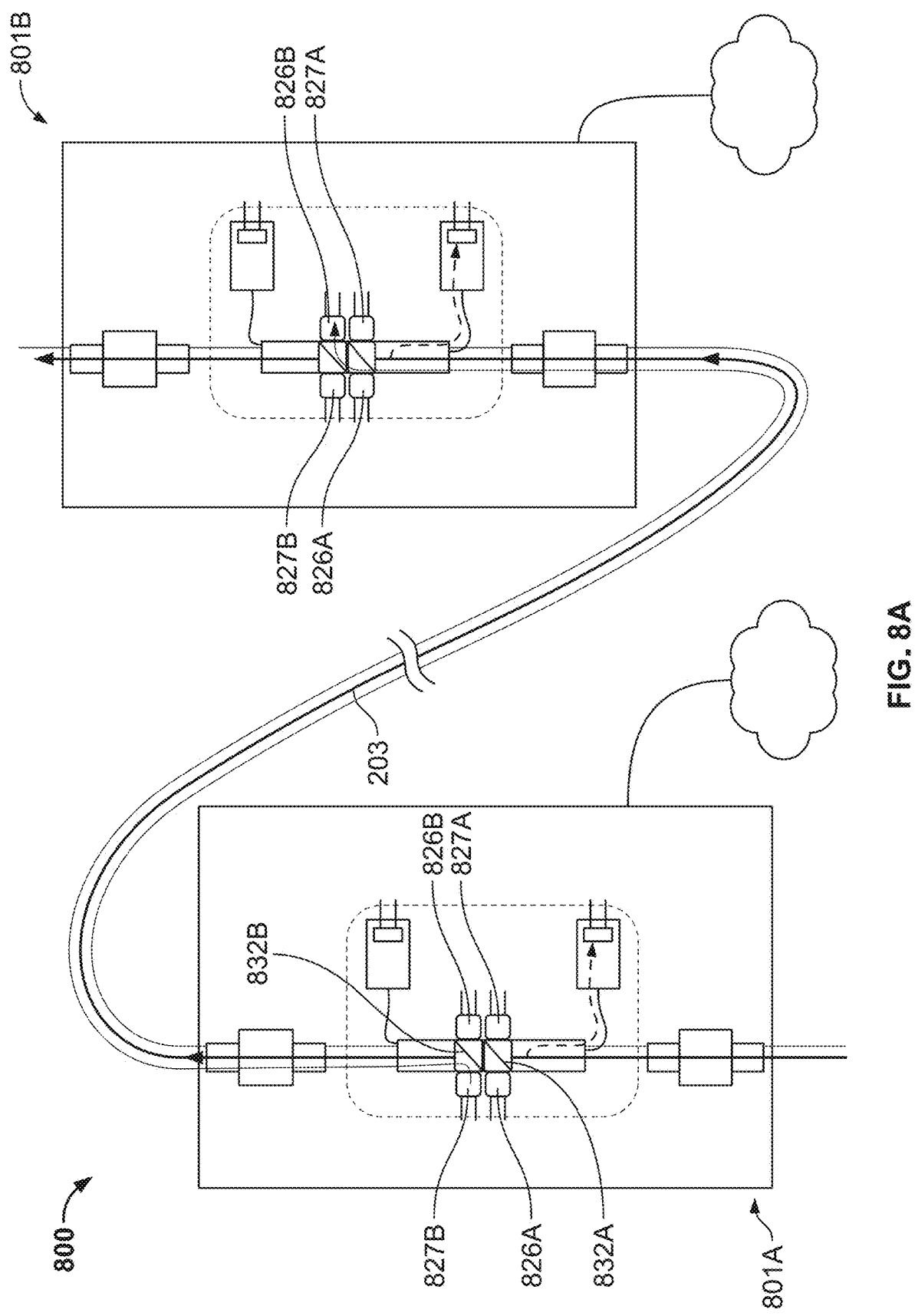
FIG. 8A is a schematic of an optical connection identification system in accordance with an embodiment.

Referring now to FIG. 8A, optical connection identification system 800 includes a plurality, in the example shown a pair, of optical connection identification assemblies 801A, 801B optically connected by intermediate optical fiber 203. Each optical connection identification assembly 801A, 801B is the same or substantially the same as optical connection identification assembly 401 with the notable exceptions that each optical connection identification assembly further includes third photodiode 826A and first light source 827A directly adjacent to and on opposite sides of first beam splitter 832A as well as fourth photodiode 826B and second light source 827B directly adjacent to and on opposite sides of second beam splitter 832B. In this manner, as shown by the arrow in the schematic of FIG. 8A, optical signals emitted from second light source 827B of optical connection identification assembly 801A are received by fourth photodiode 826B of optical connection identification assembly 801B via intermediate optical fiber 203. Upon receiving such optical signals, fourth photodiode 826B of optical connection identification assembly 801B sends an electrical signal, such as to a network connected to a terminal, to indicate optical connectivity between optical connection identification assemblies 801A, 801B. Similarly, optical signals emitted from first light source 827A of optical connection identification assembly 801B may be received by third photodiode 826A of optical connection identification assembly 801A, optical signals emitted from first light source 827A of optical connection identification assembly 801A may be received by third photodiode 826A of another optical connection identification assembly (not shown), and optical signals emitted from second light source 827B of optical connection identification assembly 801B may be received by fourth photodiode 826B of yet another optical connection identification assembly (not shown) to indicate connectivity between respective directly adjacent optical connection identification assemblies of optical connection identification system 800.

Figure 8B:
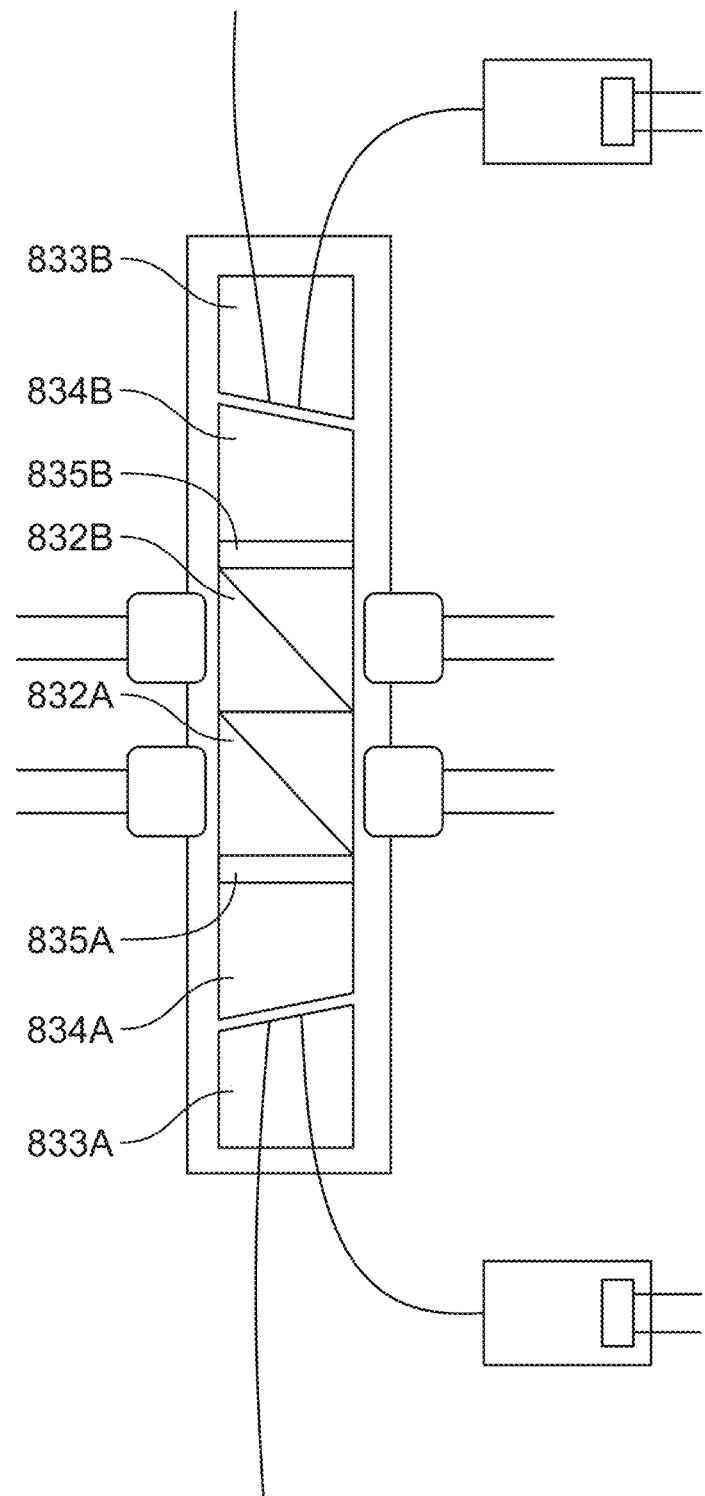
FIG. 8B is a schematic of a power monitoring section of the optical connection identification system of FIG. 8A.

As shown in FIG. 8B, the optical filter module of each of optical connection identification assemblies 801A, 801B may each include first fiber support 833A, first collimation lens 834A directly adjacent to the first fiber support, first tap filter 835A directly adjacent to the first collimation lens, first beam splitter 832A directly adjacent to the first tap filter, second beam splitter 832B directly adjacent to the first beam splitter, second tap filter 835B directly adjacent to the second beam splitter 832B, second collimation lens 834B directly adjacent to the second tap filter, and second fiber support 833B directly adjacent to the second collimation lens.

Figure 9:
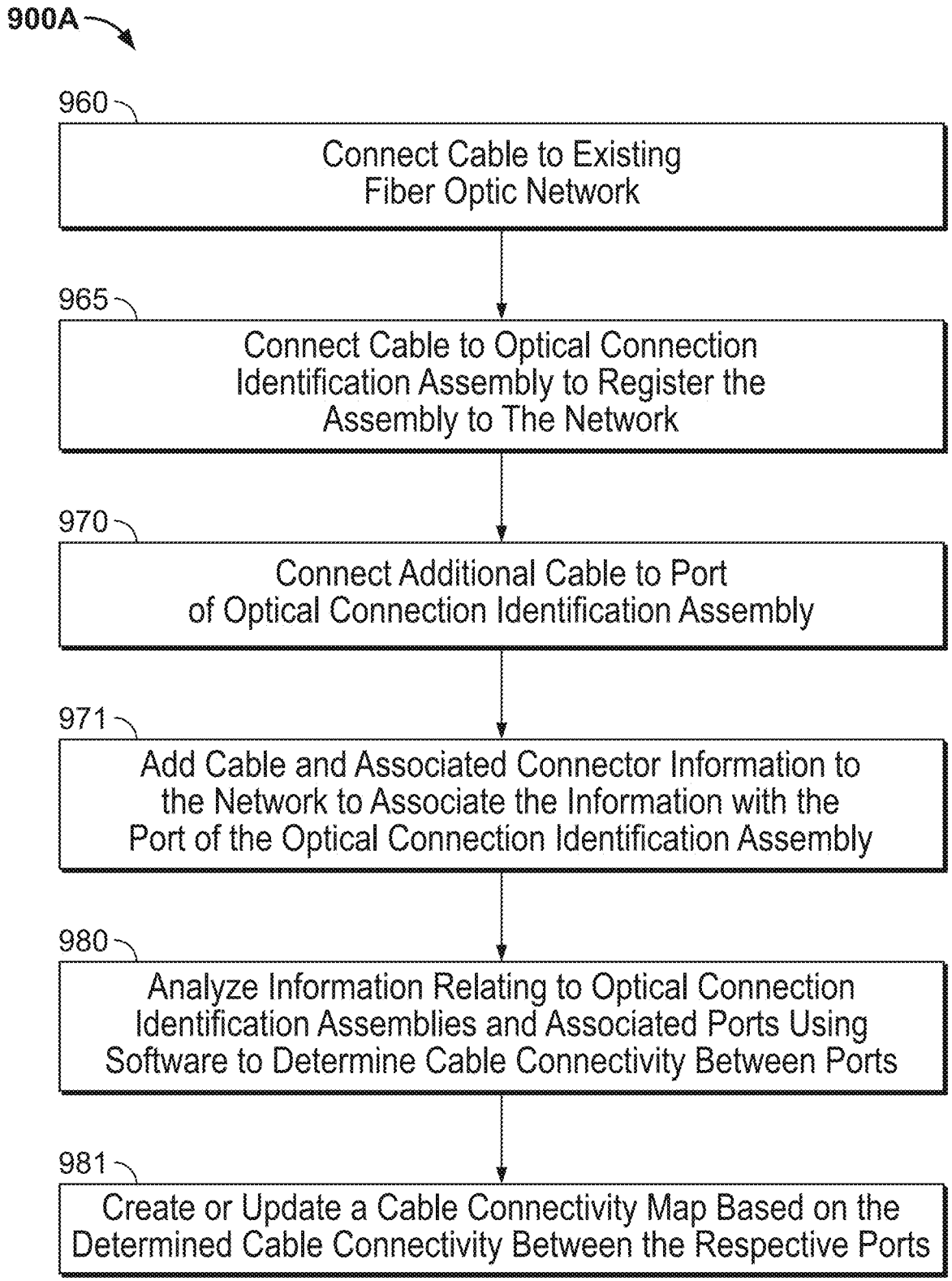
FIG. 9 is a flow diagram for an optical connection identification system connectivity and connectivity monitoring process in accordance with an embodiment.
Figure 10:
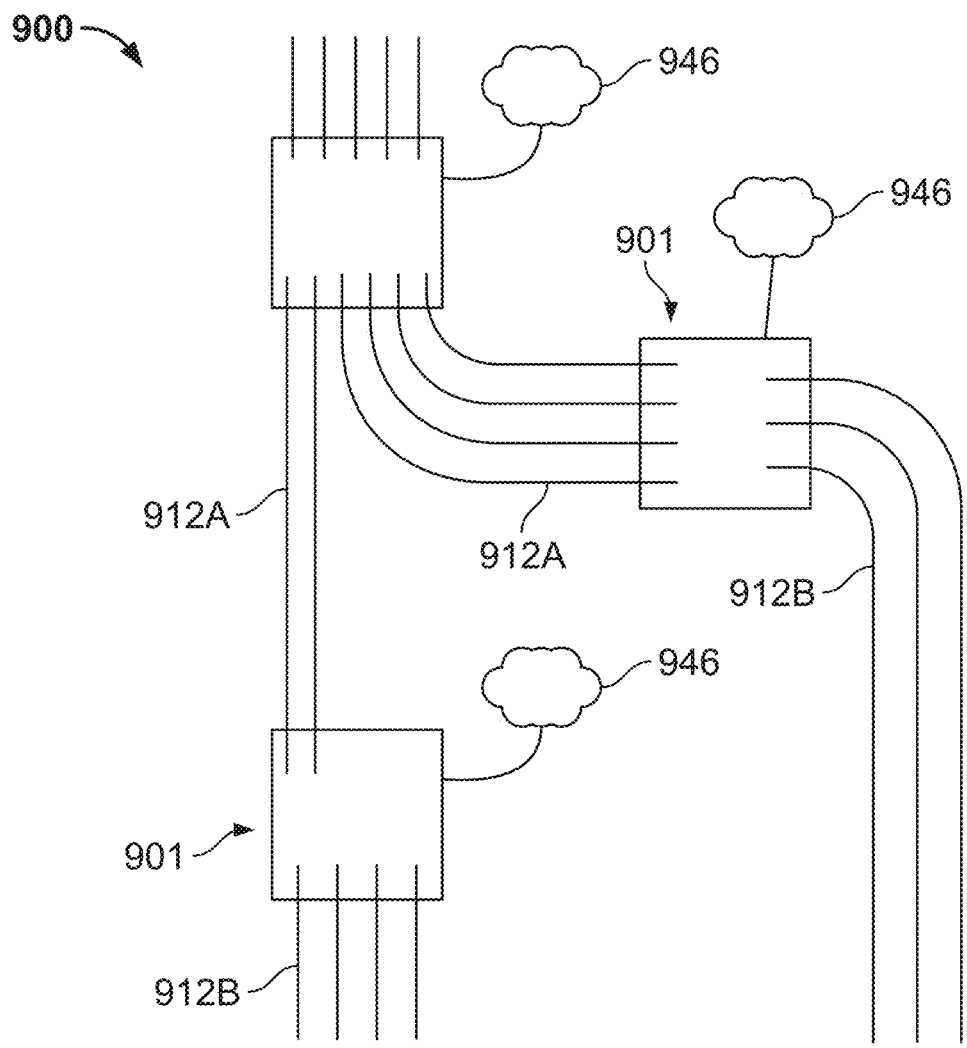
FIG. 10 is an optical connection identification system for use in the process shown in FIG. 9.
Figure 10:
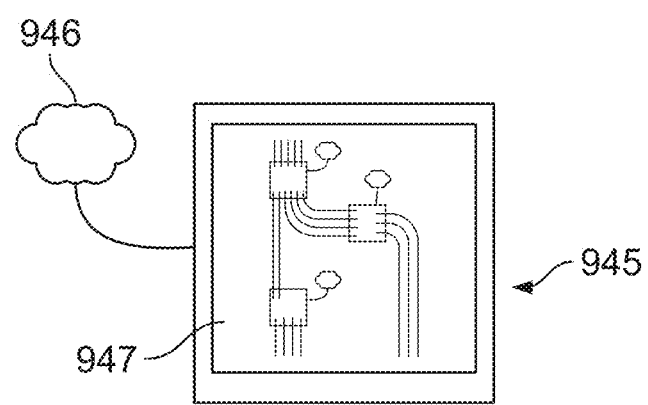

Referring now to FIGS. 9 and 10, optical connection identification assembly 901, which may be but is not limited to being any one of optical connection identification assemblies 201, 202, 301, 401, 501, 601, 801A, 801B, may be used in an intelligent optical connection identification system 900, which may be in the form of a fiber optic network, in process 900A. At step 960 of process 900A, a connector on one end of fiber optic cable 912A is plugged into existing optical connection identification system 900. At step 965, a connector on an opposite end of fiber optic cable 912A is plugged into optical connection identification assembly 901, thereby registering the optical connection identification assembly 901 to the optical connection identification system 900. At step 970, a connector on one end of fiber optic cable 912B is plugged into a port of optical connection identification assembly 901. At step 971, a technician or other operator, digitally inputs into a database associated with optical connection identification system 900 identifying information associated with fiber optic cable 912B and its associated connector plugged into optical connection identification assembly 901. As a result, the database associated with optical connection identification system 900 is updated to associate the port of optical connection identification system 900 into which the connector on the end of fiber optic cable 912B is inserted with the cable and its associated connector.

At step 980, information relating to any one or all of the optical connection identification assemblies and their associated ports within optical connection identification system 900 is received via digital cloud network 946 and software then analyzes the information to determine cable, which may be but is not limited to being fiber optic cable and electrical wire, connectivity at the ports of any individual optical connection identification assembly as well as connectivity between ports of different optical connection identification assemblies. Connectivity at ports may be determined using connector engagement sensing mechanisms disclosed in U.S. Patent Application Publication Nos. 2017/0003459 A1 and 2018/06410 A1 in which data from such connectivity or lack thereof may be sent from a microcontroller, such as microcontroller (μC) 140, to terminal 945 via network 946. Connectivity between ports of different optical connection identification assemblies may be determined using light source and photodiode pairs in optically connected optical connection identification assemblies in the manner described previously herein, such as with respect to optical connection identification system 200, 600, 800. In some arrangements, artificial intelligence may be used in conjunction with the software to make assumptions as to the connectivity of the cables within optical connection identification system 900 in order to compensate for possible operator errors in the entry of information associated with the cables by making guesses as to cable connectivity based on available information. At step 981, the software creates or updates a cable connectivity map based on the determined cable connectivity at ports of individual optical connection identification assemblies and between the optical connection identification assemblies. As shown in FIG. 10, a virtual version 947 of cable connectivity map may be viewed at terminal 945, which may be located at a central office. Based on this information, a determination may be made as to where additional cable connections may be made or where repairs may be needed within optical connection identification system 900.

Figure 11:
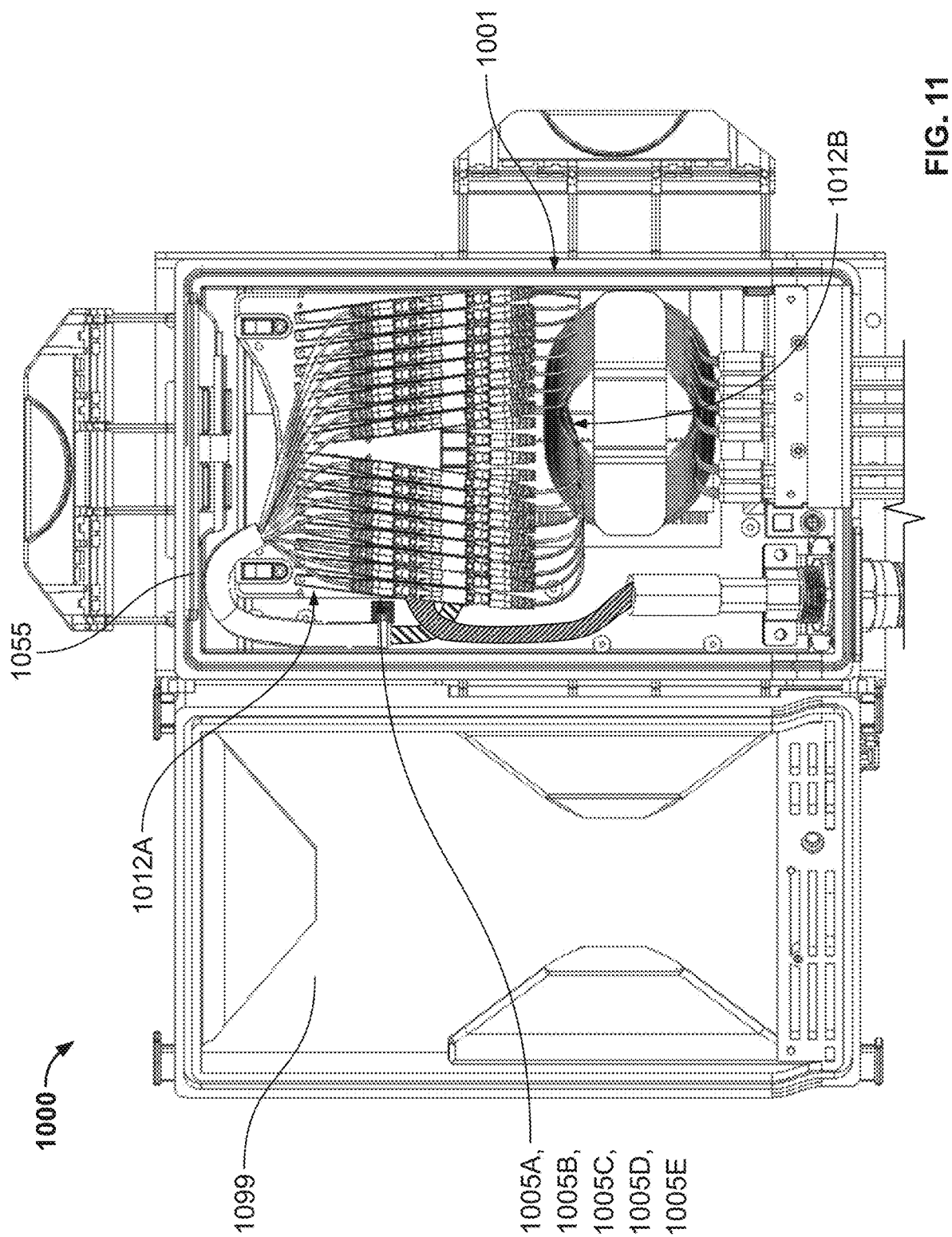
FIGS. 11 and 12 are plan views of an intelligent optical fiber termination system in accordance with another embodiment.
Figure 12:
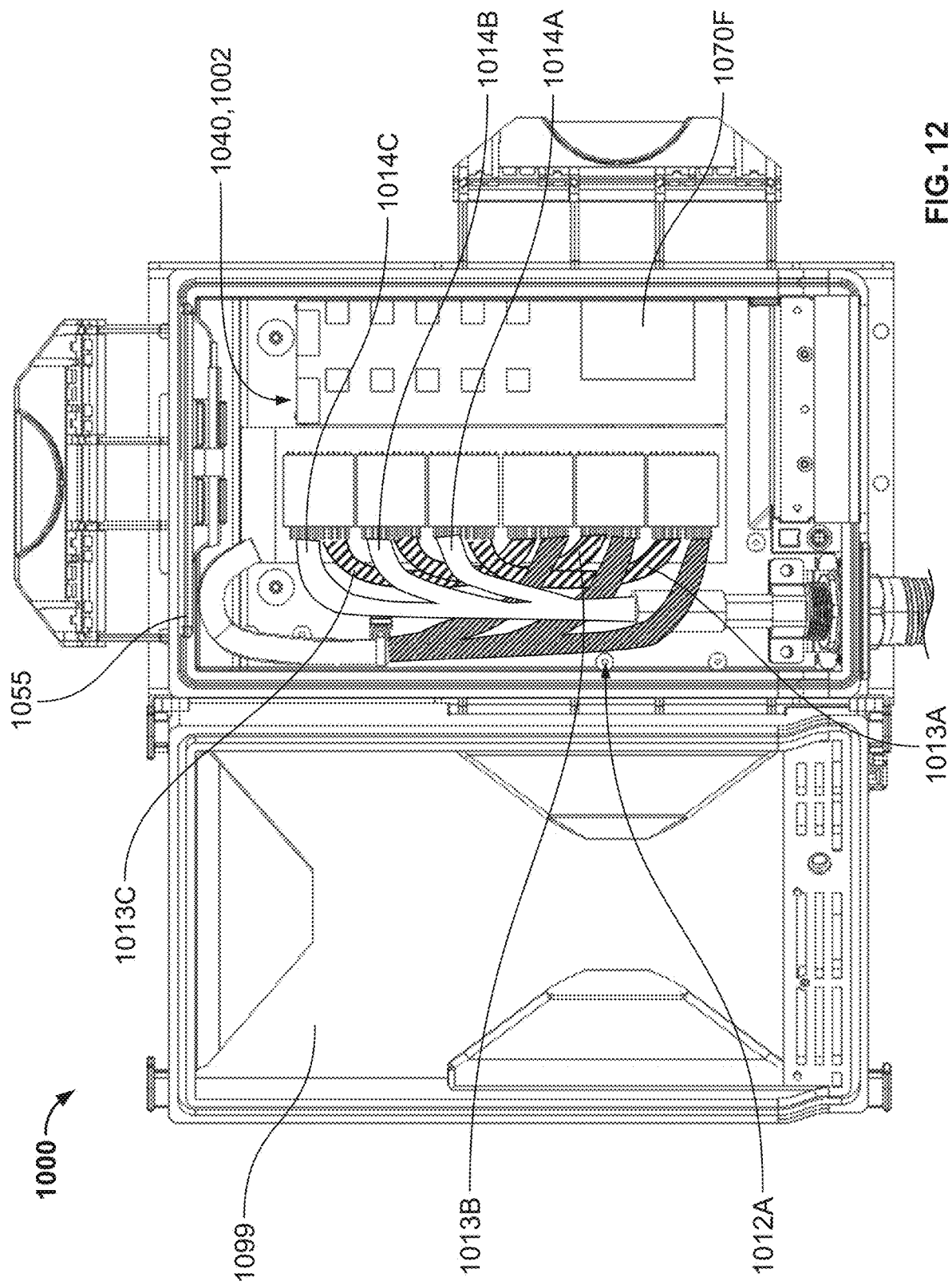

Referring now to FIGS. 11 and 12, intelligent optical fiber termination system 1000 includes enclosure 1099, optical termination assembly 1001 including various operational sensing mechanisms, other operational sensing mechanism 1060 (see FIGS. 17 and 19), at least one sensory indication unit 1055 (see FIGS. 16A and 16B), at least one operational change unit 1070 (see FIGS. 17 and 19) and main controller 1040. Optical termination assembly 1001 is attached to and enclosed by enclosure 1099 and includes a plurality of input optical fiber cables 1012A, a plurality of output optical fiber cables 1012B, a plurality of adapters 1015 having opposing receptacles for receiving connectors 1005 of corresponding ones of the input and output optical fiber cables in which corresponding sets of the input optical fiber cables, the output optical fiber cables, and the adapters are aligned in a multi-tier fashion, as further described in U.S. Provisional Patent Application No. 62/855,470, filed May 31, 2019, the disclosure of which is hereby incorporated herein by reference in its entirety.

Figure 13A:
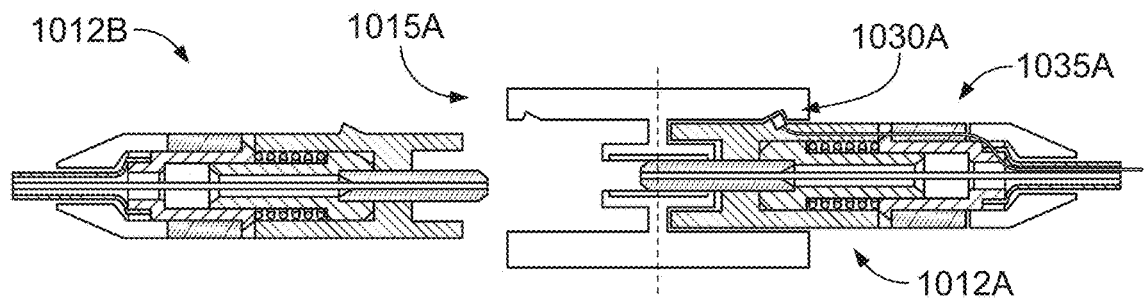
FIG. 13A-15 are cross-sectional views of a connector assemblies for use in the intelligent optical fiber termination system of FIG. 11.
Figure 13B:
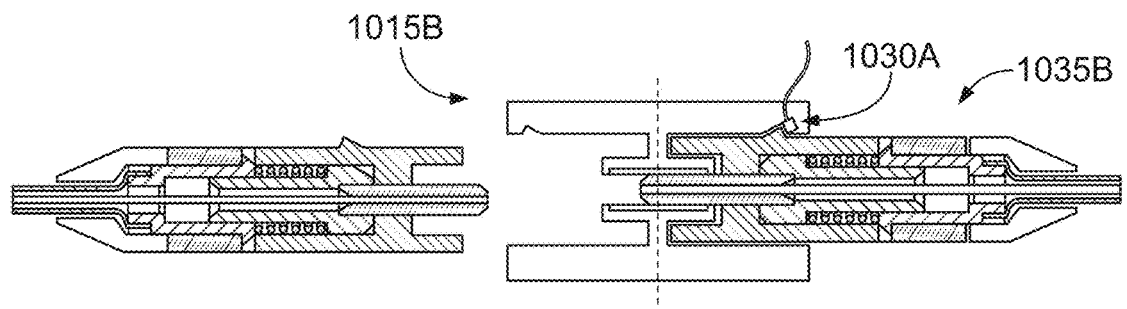
Figure 14:
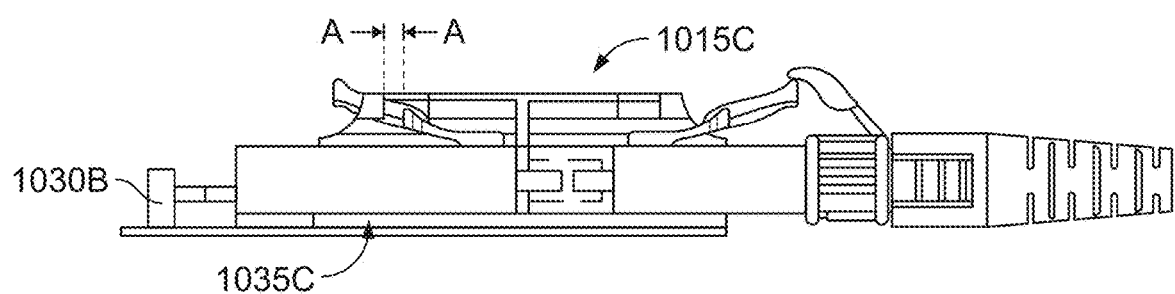

Optical termination assembly 1001 may include a connector engagement sensing mechanism such as one or more of those described in U.S. Patent Application Publication Nos. 2017/0003459 A1 ("the '459 Publication") and 2018/0136410 A1 (the '410 Publication) and further discussed above. As shown by the example connector assemblies of FIGS. 13A and 13B, force or displacement sensor 1030A may be attached to housing 1035A of one respective connector 1005A of either one or both of input and the output optical fiber cables 1012A, 1012B and may be configured for contact with adapter 1015A or such force or displacement sensor may be attached to adapter 1015B and configured for contact with a portion of housing 1035B, e.g., a projection of the housing, of one respective connector 1005B, the combination of the sensor and the housing or the adapter being in the form of insertion sensing mechanism 1081 (see FIGS. 17 and 19). As shown by the example connector assembly of FIG. 14, force or displacement sensor 1030B further may be attached to adapter 1015C such that the sensor interacts with a rear of housing 1035C of one respective connector 1005C of either one or both of the input and output optical fiber cables. Other configurations of sensors on housings of respective connectors or on adapters as further described in the '459 and the '410 Publications are also encompassed by the technology described herein. When a force is applied to sensor 1030A, 1030B when the sensor acts as a force sensor or the sensor is displaced when the sensor acts as a displacement sensor, the sensor may change states such that the sensor may convey electrical signals or stop conveying electrical signals being conveyed via main controller 1040 shown in FIG. 12, in which such electrical signals correspond to an optical fiber insertion status of optical fiber cables 1012A, 1012B having a corresponding sensor. In such manner, the insertion of respective connectors 1005A, 1005B, 1005C of either one or both of input and output optical fiber cables 1012A, 1012B (or variation thereof) into adapter 1015A, 1015B, 1015C may be detected.

Figure 15:
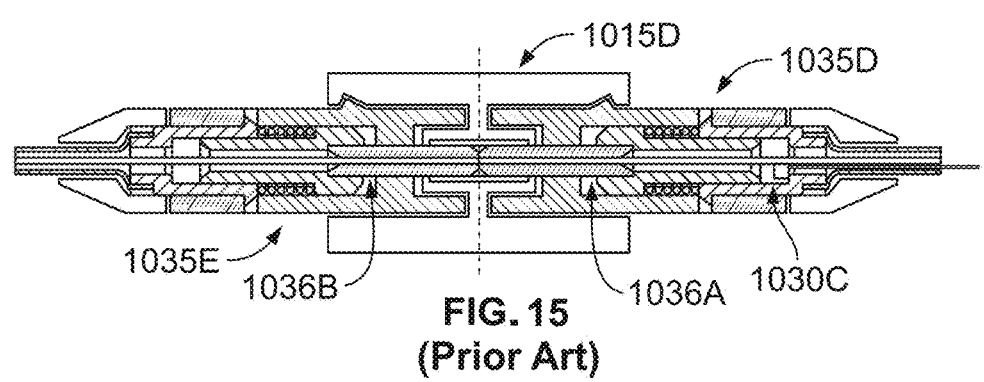
Figure 17:
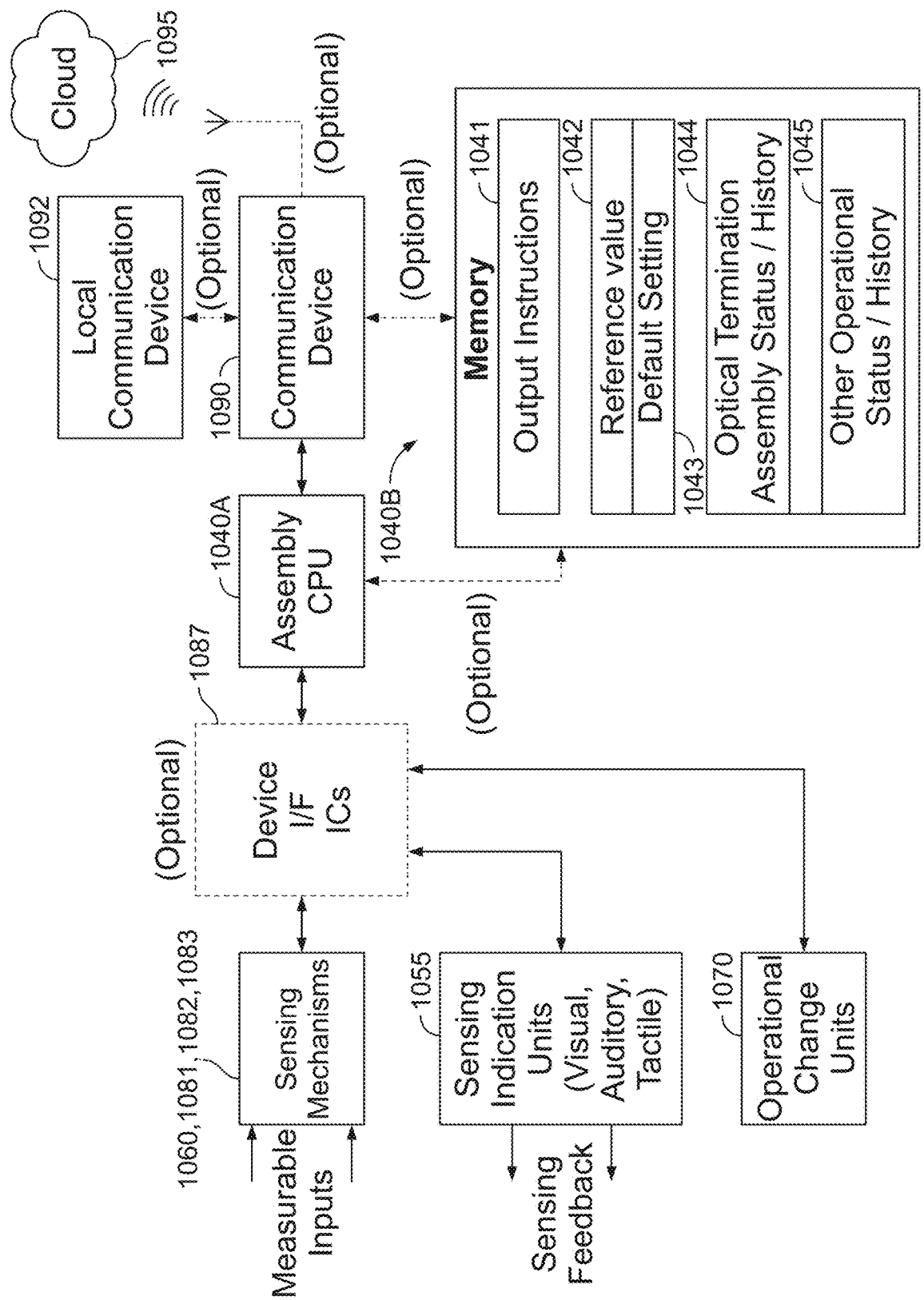
FIGS. 17 and 18 are schematics of an intelligent optical fiber termination system and a cloud network in accordance with another embodiment.
Figure 19:
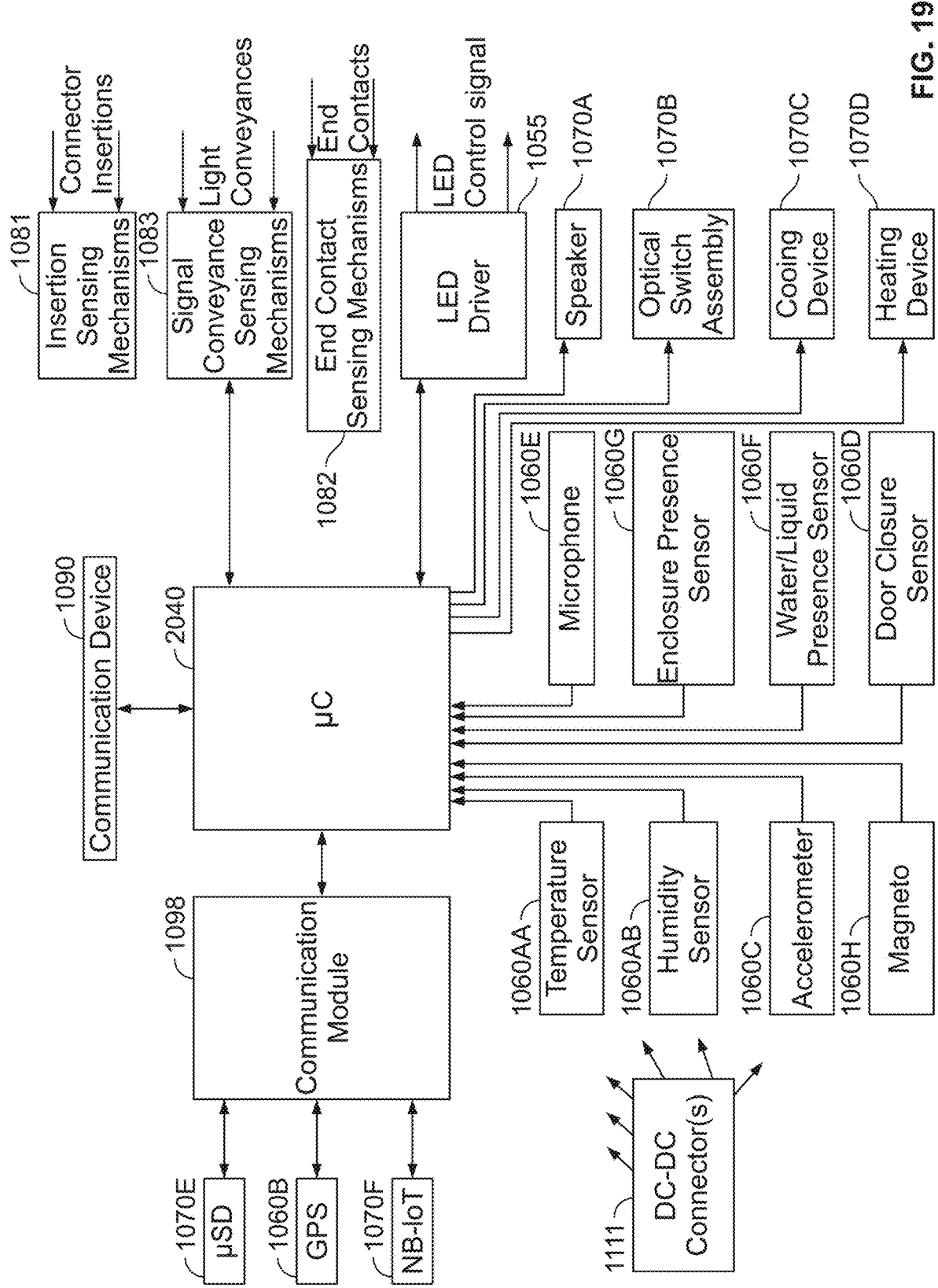
FIG. 19 is a schematic of an intelligent optical fiber termination system in accordance with an embodiment.

In some other arrangements, as shown by the example connector assembly of FIG. 15 and as further described in the '459 and the '410 Publications, force or displacement sensor 1030C may be attached between housing 1035D and ferrule 1036A (which as shown may be an outer ferrule of a two-part ferrule for an optical fiber) of respective connector 1005D of either one or both of the input and the output optical fiber cables in the form of end contact sensing mechanism 1082 (see FIGS. 17 and 19). In this manner, contact of an end of either one of the opposing input and output optical fiber cables with an end of the other of the input and the output cables may be detected so as to ascertain an end contact status of the end of the optical fiber cable having corresponding sensor 1030C. In the example of FIG. 15, when the connectors of the opposing input and output optical fiber cables are properly aligned by adapter 1015D, an abutment of ferrules 1036A, 1036B (which as shown may be an abutment of inner ferrules of the two-part ferrules for the opposing optical fibers) translatable within respective housings 1035D, 1035E of connectors 1005D, 1005E of the input and the output optical fiber cables is ascertained. When a force is applied to sensor 1030C when the sensor acts as a force sensor or the sensor is displaced when the sensor acts as a displacement sensor, the sensor may change states such that the sensor may convey electrical signals or stop conveying electrical signals being conveyed via main controller 1040 shown in FIG. 12, in which such electrical signals correspond to an end contact status of ends of optical fiber cables having a corresponding sensor. In such manner, the abutment of ends of respective connectors 1005D, 1005E of the input and output optical fiber cables with other objects, e.g., the abutment of opposing ferrules 1036A, 1036B, may be detected.

Still referring to FIGS. 11 and 12, optical termination assembly 1001 may include one or more optical fiber signal conveyance sensing mechanisms 1083 (see FIGS. 17 and 19). Such mechanisms 1083 may be in the form of one or more optical connection identification systems, which in some arrangements may be in the form of optical connection identification system 200, 600, 800 or similar system utilizing one or more optical connection identification assemblies 201, 202, 301, 401, 501, 601, 801A, 801B. In this manner, conveyance of optical signals to or from, i.e., through, either one or both of any opposing input optical fiber cable 1012A or output optical fiber cable 1012B associated with an optical connection identification system may be detected, in the manner described previously herein, so as to ascertain an optical fiber conveyance status. In the example of FIGS. 11 and 12, input optical signals conveyed to input optical fibers 1012A are first received by respective photodiodes 1A, 2A, 3A from respective additional optical fibers 1014A, 1014B, 1014C in which a portion of the input optical signals conveyed to the input optical fibers are conveyed from photodiodes 1A, 2A, 3A by jumper optical fibers 1013A, 1013B, 1013C and received by respective photodiodes 1B, 2B, 3B and then the input optical signals are conveyed to the connectors of the input optical fiber cables and output optical fiber cables 1012B and adapters 1015A, 1015B, 1015C aligning the optical fibers of the input and output optical fiber cables. Conversely, in this example, output optical signals conveyed to input optical fibers 1012A via output optical fibers 1012B corresponding to respective input optical fibers are received by respective photodiodes 1B, 2B, 3B in which a portion of the output optical signals conveyed from the input and output optical fibers are conveyed by jumper optical fibers 1013A, 1013B, 1013C and received by respective photodiodes 1A, 2A, 3A, and then the output optical signals are conveyed along additional optical fibers 1014A, 1014B, 1014C to a receiving unit, such as administrator remote interface 1091 described further herein with respect to FIG. 18, external to intelligent optical fiber termination system 1000.

Figure 16A:
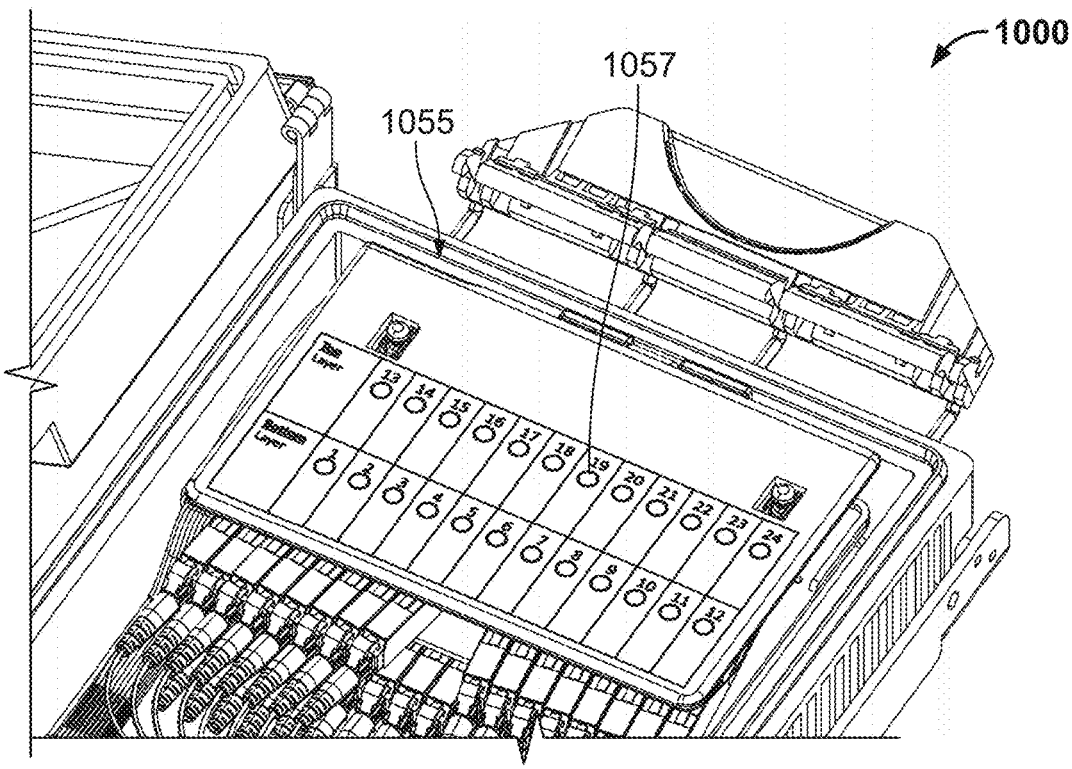
FIGS. 16A and 16B are perspective views of a sensory indication unit of the intelligent optical fiber termination system of FIG. 11.
Figure 16B:
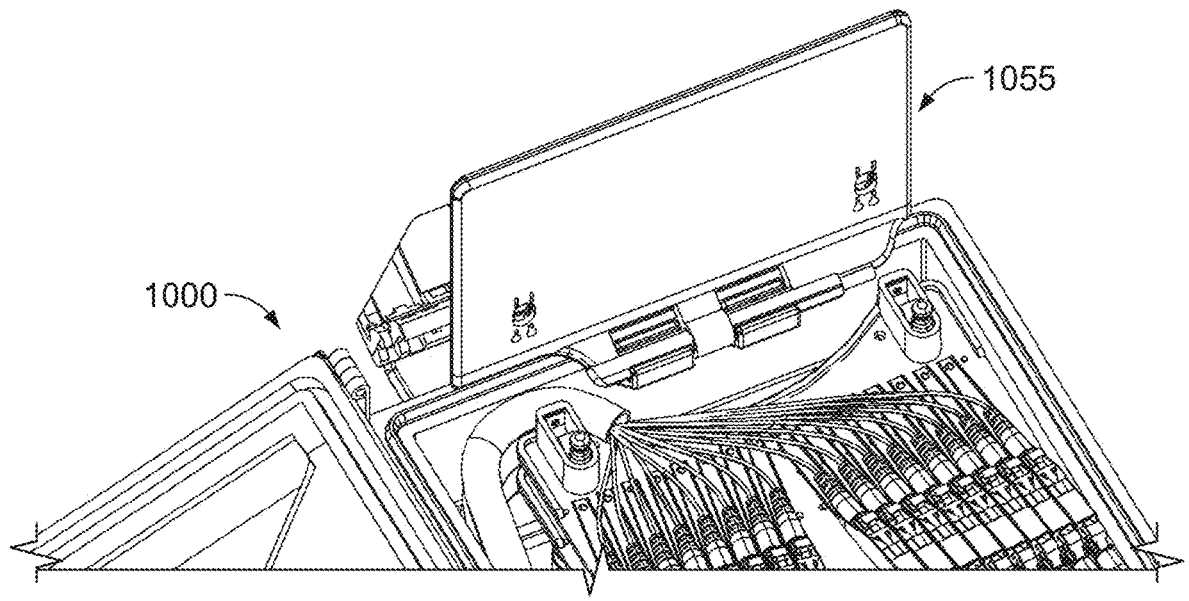

As best shown in FIGS. 16A and 16B, sensory indication unit 1055 is rotatably attached to enclosure 1099 such that the unit when in an open position exposes input optical fiber cables 1012A and when in a closed position covers the input optical fiber cables. Sensory indication unit 1055 is in electrical communication with optical fiber signal conveyance sensing mechanism 1083 just described and, as in the example shown, may include a set of light-emitting diodes (LEDs) 1057 associated with optical connection identification system 201, 202, 301, 401, 501, 601, 801A, 801B that may be configured to illuminate to indicate either that optical signals are not being received by associated photodiodes 1A, 2A, 3A, 1B, 2B, 3B, or more preferably that optical signals are being received by the associated photodiodes. While sensory indication unit 1055 is a visual indicator, in alternative arrangements, the sensory indication unit may be auditory, e.g., a speaker, or tactile, e.g., movable surface that raises to provide an alert such as for blind persons. A plurality of sensory indication units 1055 may be employed in an intelligent optical fiber termination system in accordance with the technology. As in the example shown in FIGS. 11 and 12, sensory indication unit 1055 may be in electrical communication with optical fiber signal conveyance sensing mechanism 1083 via main controller 1040.

As shown in the schematic of FIG. 17, sensory indication unit 1055 in accordance with the technology may be in electrical communication with an associated sensing mechanism, e.g., insertion sensing mechanism 1081, optical fiber signal conveyance sensing mechanism 1083, end contact sensing mechanism 1084 described above or another operational sensing mechanism 1060 as described below, via an optional device interface integrated circuit (IC) 1087 in electrical communication with assembly CPU 1040A, e.g., microcontroller 1040. With further reference to FIG. 17, operational change units that operate to alter the operational status of components of intelligent optical fiber termination system 1000 or the system as a whole are directed by assembly CPU 1040A and are in electrical communication with the associated sensing mechanisms via the assembly CPU and optionally via device interface IC 1087, as shown.

Still referring to FIG. 17, assembly CPU 1040A may be in electrical communication with communication device such that the assembly CPU may receive instructions from or provide data to an external source, such as administrator remote interface 1091 described further herein. Communication device 1090 may be a wireless router enclosed in intelligent optical fiber termination system 1000 as shown in FIG. 12. In particular, communication device 1090 may be wirelessly connected to cloud network 1095, such as the Internet of Things (IoT) or connected by wire or wirelessly such as via Bluetooth® wireless technology to a peripheral local communication device 1092, e.g. a programmable logic controller (PLC) used by a technician.

As further shown in FIG. 17, assembly CPU 1040A may be in electrical communication with memory 1040B housed within enclosure 1099 of intelligent optical fiber termination system 1000 or be in communication with such memory located at a remote location via communication device 1090. In some arrangements, such as in the example of main controller 1040 shown in FIG. 12 and of microcontroller (μC) 2040 shown in FIG. 19, assembly CPU 1040A and memory 1040B may be parts of a microcontroller. Memory may include read-only memory (ROM) and random access memory (RAM) and, as needed, secondary memory such as found on hard disk drives, universal serial bus (USD) drives, and other data writable memory to which data may be stored. As shown, memory 1040B may include but is not limited to including data associated with output instructions 1041, reference values 1042, default settings 1043, optical termination assembly status 1044, and other operational status 1045 corresponding to electrical signals conveyed to or from, whether directly or indirectly, assembly CPU 1040A.

Data associated with optical termination assembly status 1044 may include data corresponding to optical fiber insertion status, optical fiber conveyance status, and optical fiber end contact status. Such data may result from a comparison of preset reference values against associated status values conveyed via electrical signals from insertion sensing mechanisms 1081, end contact sensing mechanisms 1082, optical fiber signal conveyance sensing mechanisms 1083. Such data further may correspond to a last determined status at a particular instant in time or over a time interval and may include historical data of such statuses taken at predetermined periods. A logic controller within assembly CPU 1040A or a remote CPU (not shown) conducts a comparison between the obtained status values and reference values stored in memory.

Data associated with other operational status may include data corresponding to an operational status. Such data may result from a comparison of preset reference values against associated status values conveyed via electrical signals from one or more operational sensing mechanisms 1060 such as those described further herein. Such data further may correspond to a last determined status at a particular instant in time or over a time interval and may include historical data of such statuses taken at predetermined periods. The logic controller within assembly CPU 1040A or a remote CPU conducts the comparison between the obtained status values and reference values stored in memory.

Based on one or more of the determined optical fiber insertion status, optical fiber conveyance status, optical fiber end contact status, and operational status, the logic controller may convey electrical signals associated with output instructions 1041 stored in memory 1040B and corresponding to the one or more of the determined optical fiber insertion status, optical fiber conveyance status, optical fiber end contact status, and operational status that direct the operation of operational change units 1070 described further herein. In some instances, one or more default settings 1043 are stored in memory 1040B such that a determined optical fiber insertion status, optical fiber conveyance status, optical fiber end contact status, or operational status may be ignored and a default setting may be conveyed by the logic controller as output instructions 1041 in place of output instructions corresponding to the one or more of the determined optical fiber insertion status, optical fiber conveyance status, optical fiber end contact status, and operational status.

In some arrangements, a combination of assembly CPU 1040A and memory 1040B may be configured for machine learning in which such machine learning may be conducted over communication device 1090 and a network such as a cloud network 1095 when the assembly CPU and the memory are in communication via the communication device and a network. In such arrangements, such combination may be configured to effect a change to at least one of the reference values 1042 associated with the optical fiber insertion status, the optical fiber conveyance status, the optical fiber end contact status, and the operational status. In some such arrangements, the combination may be configured to effect the change based on an accumulated set or an entirety of a plurality of determined statuses of any one or any combination of the optical fiber insertion status, the optical fiber conveyance status, the optical fiber end contact status, and the other operational status stored by memory 1040B. In some arrangements, the combination of assembly CPU 1040A and memory 1040B may be programmed to actively effect the changes to reference values 1042 such that the changes are made without human intervention. The combination of assembly CPU 1040A and memory 1040B may initiate these changes, for example, when an average of the determined status over a period of time based on data from a sensing mechanism of intelligent optical fiber termination system 1000 changes. In one particular example, a determined status from optical fiber signal conveyance sensing mechanism 1083 may indicate that optical signals are not being conveyed between opposing optical fibers, i.e., no optical power is being utilized, during a certain period of time, e.g., the early morning hours, such that there is no need to check for connectivity of optical fiber cables and a default instruction thus may be sent to assembly CPU 1040A to not perform any analysis, thus saving system power. In another example, a determined status from optical fiber signal conveyance sensing mechanism 1083 may indicate that optical signals are being conveyed between opposing optical fibers, i.e., optical power is being utilized, during a certain period of time, e.g., during late morning hours, such that there may be no need to utilize either one of insertion sensing mechanism 1081 or end contact sensing mechanism 1082 to determine connector engagement as a lack of connector engagement would be determined when a loss of optical power occurred according to data from the optical fiber signal conveyance sensing mechanism.

Figure 18:
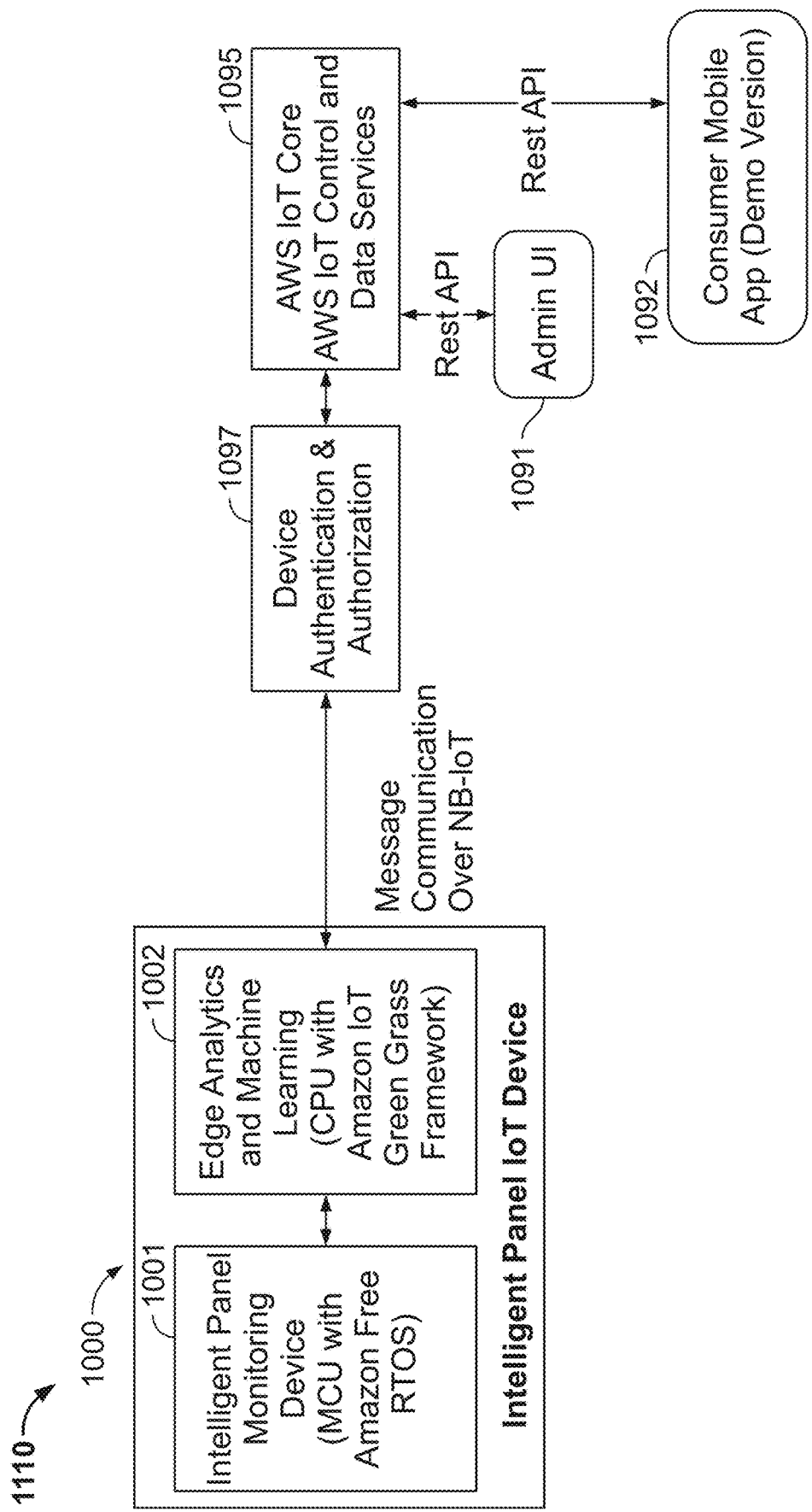

Referring now to FIG. 18, network 1110 includes intelligent panel monitoring and control system 1001, intelligent panel analysis system 1002, system authentication and authorization interface 1097, plug-in cloud network 1095, administrator remote interface 1091, and local interface 1092. Intelligent panel monitoring and control system 1001 and intelligent panel analysis system 1002, which together may form a substantial portion of intelligent optical fiber termination system 1000. In one example, intelligent panel monitoring and control system 1001 may include sensing mechanisms including insertion sensing mechanism 1081, optical fiber signal conveyance sensing mechanism 1083, end contact sensing mechanism 1082 described above or another operational sensing mechanism 1060 described below, sensory indication units 1055, and operational change units 1070. Intelligent panel analysis system 1002 may include assembly CPU 1040A and memory 1040B in the form of microcontroller 1040, 2040 and further include communication device 1090 configured for interfacing with plug-in cloud network 1095 over an ISP, e.g., an NB-IoT provided by Verizon Communications. In the example shown, plug-in cloud network 1095 is Amazon Web Services (AWS) cloud computing network owned by Amazon.com, in which the microcontroller 1040, 2040 includes AWS IoT Greengrass framework to allow provide for localized control of and machine learning by the microcontroller and system while remaining on plug-in cloud network. As in the example shown, administrator remote interface 1091 may be a central office of an ISP and local interface 1092 may be a peripheral local communication device such as local communication device 1092.

Using an application programming interfaces (APIs), e.g., a representational state transfer (REST) API, administrator remote interface 1091 and local interface 1092 may communicate with plug-in cloud network 1095. In this manner, upon accessing plug-in cloud network 1095 via system authentication and authorization interface 1097, intelligent panel analysis system 1002 interfaces with plug-in cloud network 1095 such that data, e.g., data corresponding to optical fiber insertion status, optical fiber conveyance status, optical fiber end contact status, and operational status, and instructions, e.g., output instructions 1041, may be conveyed bi-directionally via plug-in cloud network 1095. In such configuration, machine learning may be conducted over plug-in cloud network 1095 in which logic control, e.g., data analysis and decision-making, may be handled remotely at administrator remote interface 1091 and instructions based on such machine learning carried out via the combination of intelligent panel monitoring and control system 1001 and intelligent panel analysis system 1002.

Referring now to an example system in FIG. 19, intelligent optical fiber termination system 1000 may include one or more operational sensing mechanisms 1060 and operational change units 1070. Any such operational sensing mechanism 1060 may be one of optical fiber insertion sensing mechanism 1081, optical fiber signal conveyance sensing mechanism 1083, and end contact sensing mechanism 1082 or a different sensing mechanism. In some arrangements, the operational sensing mechanism, may be a device such as environmental sensor 1060AA, 1060AB, position sensor 1060B, accelerometer 1060C, door closure sensor 1060D, microphone 1060E, liquid presence sensor 1060F, enclosure presence sensor 1060G, and magneto 1060H. In various arrangements, the operational change units, as shown in FIG. 17, may be any one of speaker 1070A, optical switch assembly 1070B, cooling device 1070C, and heating device 1070D, as shown in FIG. 19.

The environmental sensor may be but is not limited to being temperature sensor 1060AA, e.g., a thermocouple, configured to ascertain a temperature of or within enclosure or other components of intelligent optical fiber termination system 1000 or humidity sensor 1060AB configured to ascertain a humidity within enclosure 1099. In this example, environmental sensor 1060AA, 1060AB conveys electrical signals to microcontroller 2040 having a combination of a CPU and memory. When microcontroller 1040 determines that either one or both of the temperature and humidity of at least a portion of the intelligent optical fiber termination system, e.g., intelligent optical fiber termination system 1000, is outside of associated reference values 1042, microcontroller directs cooling device 1070C or heating device 1070D to activate and attempt to regulate the one or both of the temperature and the humidity.

Position sensor 1060B, e.g., a global positioning system (GPS), may provide a location of enclosure 1099 or other components of intelligent optical fiber termination system 1000. In this manner, when intelligent optical fiber termination system 1000 is moved to another location, microcontroller 2040 will communicate via communication device 1090 to a remote location, e.g., administrator remote interface 1091, to alert such location to the move of intelligent optical fiber termination system 1000. As shown in FIG. 19, GPS 1060B may be an add-on operational sensing mechanism that may be plugged into communication module 1098 in electrical communication with microcontroller 2040.

Accelerometer 1060C may be a piezoelectric or more preferably a microelectromechanical system (MEMS) based accelerometer known to those skilled in the art. In some arrangements, accelerometer 1060C may be configured to detect a vibration level or changes in orientation of portions of intelligent optical fiber termination system 1000 such as enclosure 1099 or other components within the enclosure. For example, accelerometer 1060C may detect a ball striking enclosure and send an electrical signal to microcontroller 2040. If such ball strike causes vibration greater than a reference value stored in microcontroller 2040, then the microcontroller will communicate via communication device 1090 to a remote location, e.g., administrator remote interface 1091, to alert such location as to possible damage to intelligent optical fiber termination system 1000 needing repair.

Door closure sensor 1060D, which may be in the form of a force or displacement sensor, may detect the position of a door of enclosure 1099, e.g., to determine if the door is closed. If the door is detected to be in an open state, door closure sensor 1060D may send an electrical signal to microcontroller 2040 which will then communicate via communication device 1090 to a remote location, e.g., administrator remote interface 1091, to alert such location that the door is open. In such example, if no technician is known to be present at the site of intelligent optical fiber termination system 1000, then administrator remote interface 1091 may send a technician to inspect the system and close the door of enclosure 1099 if no further issues are found.

Microphone 1060E may detect the sound pressure level and frequency of sounds within enclosure 1099 and send electrical signals corresponding to such sounds to microcontroller 2040. When a sound detected by microphone 1060E is determined by microcontroller 2040 to be above reference value 1042 associated with the microphone, the microcontroller then may communicate via communication device 1090 to a remote location, e.g., administrator remote interface 1091, to alert such location as to the detected sound. In such example, if no technician is known to be present at the site of intelligent optical fiber termination system 1000, then administrator remote interface 1091 may send a technician to inspect the system to be sure no damage has been caused to the system. In some arrangements, as in the example shown in FIG. 19, when a sound detected by microphone 1060E is determined to be above reference value 1042 associated with the microphone, microcontroller 2040 then may send electrical signals to speaker 1070A to direct the speaker to issue a loud sound. Such sounds may be effective to remove animals or other living creatures from enclosure 1099.

Liquid presence sensor 1060A, which may be formed of electrodes for which only completely pure water completes a circuit with the electrodes, may detect the presence of liquids including rainwater that may have intruded into enclosure 1099. When a liquid level detected by liquid presence sensor 1060A corresponding to electrical signals from the sensor to microcontroller 2040 is determined by the microcontroller to be above reference value 1042 associated with the liquid presence sensor, microcontroller 2040 then may communicate via communication device 1090 to a remote location, e.g., administrator remote interface 1091, to alert such location as to the detected liquid. In such example, if no technician is known to be present at the site of intelligent optical fiber termination system 1000, then administrator remote interface 1091 may send a technician to inspect the system to remove the liquid, ensure no damage has been caused to the system, and as necessary appropriately seal the system.

Enclosure presence sensor 1060G, which may be in the form of a force or displacement sensor, may detect whether enclosure 1099, and thus intelligent optical fiber termination system 1000, has been removed or detached from a predetermined position, such as a telephone pole or side of a building. When a lack of presence detected by enclosure presence sensor 1060G is determined by microcontroller 2040 based on data from electrical signals conveyed by the sensor, microcontroller then may communicate via communication device 1090 to a remote location, e.g., administrator remote interface 1091, to alert such location as to the detected lack of presence of enclosure 1099. In such example, if no technician is known to be present at the site of intelligent optical fiber termination system 1000, then administrator remote interface 1091 may send a technician to inspect the system to be sure the intelligent optical fiber termination system is still present and that no damage has been caused to the system.

As further shown in FIG. 19, an intelligent optical fiber termination system such as intelligent optical fiber termination system 1000 may include additional components, including optical switch assembly 1070B and other add-on devices including microSD (µSD) card 1070E and NB-IoT device 1070F. Optical switch assembly 1070B which may be substantially in the form described in U.S. Pat. No. 9,008, 484, filed Mar. 28, 2012, the disclosure of which is incorporated herein in its entirety, may include an arm to move connectors of optical fiber cables, such as connectors of input and output optical fiber cables. In this manner, when insertion sensing mechanism 1081 detects that an associated port of associated adapter 1015A, 1015B, 1015C, 1015D is open, microcontroller 2040 may send electrical signals to optical switch assembly 1070B to insert one connector 1005A, 1005B, 1005C, 1005D, 1005E of one of input and output optical fiber cables 1012A, 1012B into the open port. Furthermore, when end contact sensing mechanism 1082 detects that an end of an associated connector, e.g., a ferrule 1036A, 1036B, of one of input and output optical fiber cables 1012A, 1012B is not in contact with another object, microcontroller 2040 may send electrical signals to optical switch assembly 1070B to, for example, fully insert such cable into proper position. MicroSD card 1070E and NB-IoT device 1070F may be insertable into communication module 1098 or another communication module within intelligent optical fiber termination system 1000 that is in electrical communication with microcontroller 2040. In the example shown, microSD card 1070E provides additional memory storage and allow for data to be collected from intelligent optical fiber termination system 1000, and NB-IoT device 1070F operates to facilitate communication as described above.

Still referring to FIG. 19, intelligent optical fiber termination system 1000 may include one or more DC-DC converters 1111 that preferably step down voltage from a utility power or other power source. In this manner, one or more components including microcontroller 2040 may be electrically powered via such a DC-DC converter as known to those skilled in the art.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. An intelligent optical fiber termination system comprising:
   an enclosure;
   an optical termination assembly within the enclosure and including (i) a first optical fiber connector, (ii) an optical fiber extending through at least a portion of the first optical fiber connector, (iii) an adapter into which the first optical fiber connector is insertable, and (iv) a sensing mechanism selected from the group consisting of (i) a first insertion sensing mechanism configured for conveying first fiber insertion status signals corresponding to a first fiber insertion status of the first optical fiber connector into the adapter, (ii) a first fiber signal conveyance sensing mechanism configured for conveying first fiber conveyance status signals corresponding to a first fiber conveyance status of input optical signals to or of output optical signals from the first optical fiber, and (iii) a first end contact sensing mechanism configured for conveying first end contact status signals corresponding to a first end contact status of an end of the first optical fiber connector with another object when the first optical fiber connector is inserted into the adapter;
   a first operational sensing mechanism configured for conveying first operational status signals different than at least one signal-type of the conveyed ones of the first fiber insertion status signals, the first fiber conveyance status signals, and the first end contact status signals and corresponding to a first operational status of the intelligent optical fiber termination system;
   a first component at least partially within the enclosure; and
   a central processing unit (CPU) configured for receiving a plurality of CPU input signals respectively corresponding to each of the conveyed ones of the first fiber insertion status signals, the first fiber conveyance status signals, the first end contact status signals, and the first operational status signals and conveying a first directional signal to direct a change in a physical state of the first component based on the CPU input signals received by the CPU.

2. The intelligent optical fiber termination system of claim 1, wherein the intelligent optical fiber termination system is configured for receiving external input signals selected from the group consisting essentially of external input radio signals, external input electrical signals, external input optical signals, and any combination thereof from an external source external to the intelligent optical fiber termination system, and wherein the CPU is configured to convey the first directional signal to the first component in response to the external input signals.

3. The intelligent optical fiber termination system of claim 1, wherein the intelligent optical fiber termination system is configured for conveying system output signals selected from the group consisting of system output radio signals, system output electrical signals, system output optical signals, and any combination thereof to an external source external to the intelligent optical fiber termination system, and wherein the system output signals are directed by the CPU.

4. The intelligent optical fiber termination system of claim 1, wherein the first operational status signals are second fiber insertion status signals different from the first fiber insertion status signals and corresponding to a second fiber insertion status of a second optical fiber connector insertable into the adapter.

5. The intelligent optical fiber termination system of claim 1, wherein the first optical fiber connector includes a first housing and a first ferrule translatable within the first housing, and wherein the first end contact sensing mechanism conveys first end contact status signals indicating contact of the end of the first optical fiber connector with another object when the first optical fiber connector is inserted into the adapter and the first ferrule of the first optical fiber connector is in contact with a second ferrule of a second optical fiber connector.

6. The intelligent optical fiber termination system of claim 1, wherein each of the conveyed ones of the first fiber insertion status signals, the first fiber conveyance status signals, the first end contact status signals, and the first operational status signals are conveyed at one or more respective predetermined time intervals.

7. The intelligent optical fiber termination system of claim 1, further comprising a memory storage system in communication with a microprocessor of the CPU and configured for storing any one or any combination of the first fiber insertion statuses, the first fiber conveyance statuses, the first end contact statuses, and the first operational statuses.

8. The intelligent optical fiber termination system of claim 7, wherein a first combination of at least two mechanisms selected from the group consisting of the first insertion sensing mechanism, the first fiber conveyance sensing mechanism, and the first end contact sensing mechanism are conveying the respective first fiber insertion status signals, first fiber conveyance status signals, and first end contact status signals, and wherein the first operational sensing mechanism is one of the mechanisms of the first combination.

9. The intelligent optical fiber termination system of claim 7, wherein the memory storage system stores (i) a first fiber insertion reference value for use in determining the first fiber insertion status when the optical termination assembly includes the first insertion sensing mechanism, (ii) a first fiber conveyance reference value for use in determining the first fiber conveyance status when the optical termination assembly includes the first fiber conveyance sensing mechanism, (iii) a first end contact reference value for use in determining the first end contact status when the optical termination assembly includes the first end contact sensing mechanism, and (iv) a first operational reference value for use in determining the first operational status, the intelligent optical fiber termination system further comprising a logic controller in communication with the memory storage system, the logic controller being part of or being separate from but in communication with the CPU, wherein the logic controller is configured for determining (i) a first relative value associated with the first fiber insertion status and based on a comparison of a determined first fiber insertion status value corresponding to the first fiber insertion status signals to the first fiber insertion reference value when the memory storage device stores the first fiber insertion reference value, (ii) a second relative value associated with the first fiber conveyance status and based on a comparison of a determined first fiber conveyance status value corresponding to the first fiber conveyance status signals to the first fiber conveyance reference value when the memory storage device stores the first fiber conveyance reference value, (iii) a third relative value associated with the first end contact status and based on a comparison of a determined first end contact status value corresponding to the first end contact status signals to the first end contact reference value when the memory storage device stores the first end contact reference value, and (iv) a fourth relative value associated with the first operational status and based on a comparison of a determined first operational status value corresponding to the first operational status signals to the first operational reference value.

10. The intelligent optical fiber termination system of claim 9, wherein the first directional signal is based on at least one relative value of the first, the second, the third, and the fourth relative values determined by the logic controller, and wherein the CPU is configured for conveying a second directional signal to the first component or another component different from the first component and at least partially within the enclosure based on at least one different relative value of the first, the second, the third, and the fourth relative values.

11. The intelligent optical fiber termination system of claim 9, wherein a combination of the CPU, the logic controller when separated from the CPU, and the memory storage system are configured to effect a change to at least one of the reference values of the first insertion reference value, the first fiber conveyance status value, the first end contact status value, and the first operational value.

12. The intelligent optical fiber termination system of claim 11, wherein the combination of the CPU, the logic controller when separated from the CPU, and the memory storage system are configured to effect the change to the at least one of the reference values of the first insertion reference value, the first fiber conveyance status value, the first end contact status value, and the first operational value based on the external input signals received by the intelligent optical fiber termination system.

13. The intelligent optical fiber termination system of claim 6, wherein the intelligent optical fiber termination system is configured to convey the system output signals to the external source, and wherein the external input signals are based on the system output signals to the external source.

14. The intelligent optical fiber termination system of claim 12, further comprising a transceiver in electrical communication with the CPU and configured for communicating wirelessly with a cloud network, wherein the transceiver is configured for receiving the external input signals and the external source is remote from the enclosure and within the cloud network.

15. The intelligent optical fiber termination system of claim 14, wherein the transceiver is further configured for conveying the system output signals to the external source.

16. The intelligent optical fiber termination system of claim 11, wherein the memory storage system stores a plurality of (i) the determined first fiber insertion status values when the memory storage device stores the first fiber insertion reference value, (ii) the determined first fiber conveyance status values when the memory storage device stores the first fiber conveyance reference value, (iii) the determined first end contact status values when the memory storage device stores the first end contact reference value, and (iv) the determined first operational status values, and wherein the combination of the CPU, the logic controller when separated from the CPU, and the memory storage system are configured to effect the change to (i) the first fiber insertion reference value when the optical termination assembly includes the first insertion sensing mechanism based on an accumulated set or the entirety of the plurality of the first fiber insertion status values, (ii) the first fiber conveyance reference value when the optical termination assembly includes the first fiber conveyance sensing mechanism based on an accumulated set or the entirety of the plurality of the first fiber conveyance status values, (iii) the first end contact reference value when the optical termination assembly includes the first end contact sensing mechanism based on an accumulated set or the entirety of the plurality of the first end contact status values, and (iv) the first operational reference value based on an accumulated set or the entirety of the plurality of the first operational status values.

17. The intelligent optical fiber termination system of claim 16, wherein the change effected to (i) the first fiber insertion reference value is to ignore the first fiber insertion reference value and set the first insertion sensing mechanism to a default setting, (ii) the first fiber conveyance reference value is to ignore the first fiber conveyance reference value and set the first fiber conveyance sensing mechanism to a default setting, (iii) the first end contact reference value is to ignore the first end contact reference value and set the first end contact sensing mechanism to a default setting, and (iv) the first operational reference value is to ignore the first operational reference value and set the first operational sensing mechanism to a default setting.

18. An intelligent optical fiber termination network comprising:
the intelligent optical fiber termination system of claim 7, further comprising a transceiver in electrical communication with the CPU; and
a cloud network including the memory storage system and being configured for communicating wirelessly with the transceiver of the intelligent optical fiber termination system.

19. The intelligent optical fiber termination network of claim 18, wherein the intelligent optical fiber termination network is a wide area network (WAN) comprising a remote site remote from the intelligent optical fiber termination system.

20. An intelligent optical fiber termination network comprising:
the intelligent optical fiber termination system of claim 9, further comprising a transceiver in electrical communication with the CPU; and
a cloud network including the logic controller when separated from the CPU, the logic controller being located at a remote site remote from the intelligent optical fiber termination system, the cloud network being configured for communicating wirelessly with the transceiver of the intelligent optical fiber termination system such that the transceiver receives the external input signals conveyed from the logic controller.

21. The intelligent optical fiber termination system of claim 1, further comprising a transceiver in electrical communication with the CPU and configured for communicating wirelessly with a cloud network, wherein the first directional signal is provided by the CPU to the first component based on a first transceiver signal from the transceiver and a second directional signal is provided to the first component or another component different from the first component and at least partially within the enclosure based on a second transceiver signal from the transceiver.

22. The intelligent optical fiber termination system of claim 1, wherein the operational sensing mechanism includes any one or any combination of an environmental sensor, a position sensor, an orientation sensor, a sensor detecting either one or both of the opening and closure of a door of the enclosure, a microphone, an accelerometer, a water presence sensor, and an enclosure presence sensor.

23. The intelligent optical fiber termination system of claim 22, wherein the operational sensing mechanism is an environmental sensor and is either one or both of a temperature sensor and a humidity sensor.

24. The intelligent optical fiber termination system of claim 22, wherein the operational sensing mechanism is an environmental sensor, and wherein the first component includes a heating device, wherein the heating device is activated to heat at least a portion of an interior of the enclosure when the environmental sensor detects a temperature below a predetermined threshold.

25. The intelligent optical fiber termination system of claim 22, wherein the operational sensing mechanism is an environmental sensor, and wherein the first component includes a cooling device, wherein the cooling device is activated to cool at least a portion of an interior of the enclosure when the environmental sensor detects either one or both of a temperature above a predetermined threshold and a humidity level above a predetermined threshold.

26. The intelligent optical fiber termination system of claim 25, wherein the cooling device includes a fan.

27. The intelligent optical fiber termination system of claim 1, wherein the first component or another component separate from the first component is a sensory indication unit configured to indicate a change in any one or any combination of (i) the first fiber insertion status when the optical termination assembly includes the first insertion sensing mechanism, (ii) the first fiber conveyance status when the optical termination assembly includes the first fiber conveyance sensing mechanism, (iii) the first end contact status when the optical termination assembly includes the first end contact sensing mechanism, and (iv) the first operational status, the sensory indication unit providing any one or any combination of a visual signal, an auditory signal, or a tactile signal.

28. The intelligent optical fiber termination system of claim 27, wherein the sensory indication unit includes any one or any combination of a light emitting diode (LED), an audio speaker, and a piston-driven actuator assembly.

29. The intelligent optical fiber termination system of claim 1, wherein each of the conveyed ones of the first fiber insertion status signals, the first fiber conveyance status signals, the first end contact status signals are different than the conveyed first operational status signals.

30. An intelligent optical fiber termination system comprising:
an enclosure;
an optical termination assembly within the enclosure and including (i) a first optical fiber connector, (ii) an optical fiber extending through at least a portion of the first optical fiber connector, (iii) an adapter into which the first optical fiber connector is insertable, and (iv) a sensing mechanism selected from the group consisting of (i) a first insertion sensing mechanism configured for conveying first fiber insertion status signals corresponding to a first fiber insertion status of the first optical fiber connector into the adapter, (ii) a first fiber signal conveyance sensing mechanism configured for conveying first fiber conveyance status signals corresponding to a first fiber conveyance status of input optical signals to or of output optical signals from the first optical fiber, and (iii) a first end contact sensing mechanism configured for conveying first end contact status signals corresponding to a first end contact status of an end of the first optical fiber connector with another object when the first optical fiber connector is inserted into the adapter;

an environmental sensor configured for conveying first operational status signals different than the conveyed ones of the first fiber insertion status signals, the first fiber conveyance status signals, and the first end contact status signals and corresponding to a first operational status of the intelligent optical fiber termination system;

a first component at least partially within the enclosure; and a central processing unit (CPU) configured for receiving a plurality of CPU input signals respectively corresponding to each of the conveyed ones of the first fiber insertion status signals, the first fiber conveyance status signals, the first end contact status signals, and the first operational status signals and conveying a first directional signal to direct a change in a physical state of the first component based on the CPU input signals received by the CPU.

* * * * *